US011056282B2

(12) United States Patent
Sasaki et al.

(10) Patent No.: US 11,056,282 B2
(45) Date of Patent: Jul. 6, 2021

(54) METHOD OF MANUFACTURING A CAPACITOR INCLUDING DIELECTRIC STRUCTURE FORMED OF SINTERED BODY

(71) Applicants: HEADWAY TECHNOLOGIES, INC., Milpitas, CA (US); TDK CORPORATION, Tokyo (JP)

(72) Inventors: Yoshitaka Sasaki, Santa Clara, CA (US); Hiroyuki Ito, Milpitas, CA (US); Hironori Araki, Milpitas, CA (US); Seiichiro Tomita, Milpitas, CA (US); Atsushi Iijima, Tokyo (JP)

(73) Assignees: HEADWAY TECHNOLOGIES, INC., Milpitas, CA (US); TDK CORPORATION, Tokyo (JP)

( * ) Notice: Subject to any disclaimer, the term of this patent is extended or adjusted under 35 U.S.C. 154(b) by 309 days.

(21) Appl. No.: 16/149,883

(22) Filed: Oct. 2, 2018

(65) Prior Publication Data

US 2019/0035558 A1 Jan. 31, 2019

Related U.S. Application Data

(62) Division of application No. 15/651,582, filed on Jul. 17, 2017, now Pat. No. 10,283,274.

(51) Int. Cl.
| | |
|---|---|
| *H01G 4/30* | (2006.01) |
| *H01G 4/012* | (2006.01) |
| *H01G 4/12* | (2006.01) |
| *H01G 4/232* | (2006.01) |
| *H01G 4/248* | (2006.01) |

(52) U.S. Cl.
CPC ............ *H01G 4/30* (2013.01); *H01G 4/012* (2013.01); *H01G 4/232* (2013.01); *H01G 4/248* (2013.01); *H01G 4/12* (2013.01); *Y10T 29/435* (2015.01)

(58) Field of Classification Search
CPC .......... H01G 4/012; H01G 4/12; H01G 4/232; H01G 4/248; H01G 4/30; H01G 4/302; H01G 4/306; H01G 4/33; H01G 13/00; H01G 13/006; Y10T 29/435
See application file for complete search history.

(56) References Cited

U.S. PATENT DOCUMENTS

| | | | |
|---|---|---|---|
| 7,903,387 | B2 | 3/2011 | Masuda et al. |
| 8,085,522 | B2 | 12/2011 | Sasaki et al. |
| 8,432,662 | B2 | 4/2013 | Sasaki et al. |
| 8,462,482 | B2 | 6/2013 | Sasaki et al. |
| 2009/0052110 | A1 | 2/2009 | Masuda et al. |

(Continued)

*Primary Examiner* — Peter Dungba Vo
*Assistant Examiner* — Joshua D Anderson
(74) *Attorney, Agent, or Firm* — Oliff PLC

(57) ABSTRACT

A capacitor includes a dielectric structure formed of a sintered dielectric, and a first electrode and a second electrode each formed of a conductor. The dielectric structure includes a wall. The first electrode and the second electrode are insulated from each other by the wall. The wall has a height which is a dimension in a first direction, and a thickness which is a dimension in a second direction orthogonal to the first direction, the height being greater than the thickness. The wall has a non-straight shape when seen in the first direction. A manufacturing method for the capacitor includes forming the dielectric structure, and forming the first electrode and the second electrode simultaneously after the formation of the dielectric structure.

9 Claims, 30 Drawing Sheets

(56) References Cited

U.S. PATENT DOCUMENTS

| | | |
|---|---|---|
| 2010/0195264 A1 | 8/2010 | Sasaki et al. |
| 2012/0300360 A1 | 11/2012 | Take et al. |
| 2013/0329337 A1* | 12/2013 | Masuda ................ H01G 4/012 361/303 |
| 2015/0155100 A1 | 6/2015 | Morita |

* cited by examiner

METHOD OF MANUFACTURING A CAPACITOR INCLUDING DIELECTRIC STRUCTURE FORMED OF SINTERED BODY

CROSS REFERENCE TO RELATED APPLICATION

This application is a divisional application of U.S. application Ser. No. 15/651,582, filed Jul. 17, 2017, the contents of which are incorporated herein by reference.

BACKGROUND OF THE INVENTION

1. Field of the Invention

The present invention relates to a capacitor including a dielectric structure formed of a sintered body, and a manufacturing method thereof.

2. Description of the Related Art

Capacitors are used in various electronic components. One known kind of capacitor is a multilayer ceramic capacitor (hereinafter referred to as MLCC), such as one disclosed in US 2015/0155100 A1.

The MLCC is manufactured by the following method. First, prepared are ceramic greensheets each having an unfired conductor layer of conductive paste formed thereon. Then, the ceramic greensheets are laminated into an unfired multilayer structure. The unfired multilayer structure is then fired into a fired multilayer structure. The fired multilayer structure includes first electrodes, second electrodes, and dielectric layers. The first and second electrodes are arranged alternately and insulated from each other by the dielectric layers. The manufacturing method for the MLCC then proceeds to forming a first terminal electrically connected to the first electrodes, and a second terminal electrically connected to the second electrodes.

Other kinds of capacitors than MLCC include the following first to third kinds of capacitors.

A capacitor of the first kind is disclosed in U.S. Pat. No. 8,085,522 B2. The capacitor of the first kind includes a first conductor section, a second conductor section, and a dielectric layer. The first conductor section includes a plurality of projections spaced from each other. The second conductor section includes a plurality of portions located between every adjacent projections. The dielectric layer is interposed between the first conductor section and the second conductor section. U.S. Pat. No. 8,085,522 B2 discloses, as a manufacturing method for the capacitor of the first kind, a method including forming the first conductor section, then forming the dielectric layer by such a process as CVD or atomic layer deposition, and then forming the second conductor section.

A capacitor of the second kind is disclosed in each of U.S. Pat. No. 8,432,662 B2 and U.S. Pat. No. 8,462,482 B2. The capacitor of the second kind includes a pair of internal electrodes of a comb shape and a dielectric layer. The pair of internal electrodes are arranged with a gap therebetween. The dielectric layer is formed to fill the gap. Each of U.S. Pat. No. 8,432,662 B2 and U.S. Pat. No. 8,462,482 B2 discloses, as a manufacturing method for the capacitor of the second kind, a method including forming the pair of internal electrodes and then forming the dielectric layer.

A capacitor of the third kind is disclosed in U.S. Pat. No. 7,903,387 B2. The capacitor of the third kind includes a plurality of generally tube-shaped dielectric structures, a first electrode disposed between the plurality of dielectric structures, and a plurality of generally pillar-shaped second electrodes disposed in the plurality of dielectric structures. U.S. Pat. No. 7,903,387 B2 discloses the following manufacturing method for the capacitor of the third kind. In the manufacturing method, first, a substrate of a metal is anodized to form an oxide substrate having a plurality of holes. Then, the oxide substrate is processed into the plurality of generally tube-shaped dielectric structures. Then, the first electrode and the second electrode are formed.

Examples of means for increasing the capacitance of a capacitor include the following first to third means. The first means is to reduce the thickness of the dielectric layer or dielectric structure interposed between two electrodes. The second means is to increase the areas of two surfaces of two electrodes facing each other with a dielectric layer or dielectric structure therebetween. The third means is to use a high-permittivity material, such as $BaTiO_3$, to form the dielectric layer or dielectric structure.

For MLCCs and the capacitors of the first to third kinds, employing the foregoing first to third means to achieve an increased capacitance presents problems as described below.

For MLCCs, each of the dielectric layers is flat plate-like, and thus apt to crack upon undergoing a stress due to heat or an external force. As a result, a short circuit between two electrodes is likely to occur.

For the capacitor of the first kind, it is difficult to form a thin dielectric layer with high thickness precision, and thus capacitance variations are likely to occur due to thickness variations of the dielectric layer. A further problem with the capacitor of the first kind is that it is also difficult to form a dielectric layer of $BaTiO_3$ by CVD or atomic layer deposition.

For the capacitor of the second kind, a dielectric layer is formed to fill the gap between a pair of internal electrodes. This presents a problem that where the formation process for the dielectric layer includes heat treatment, the dielectric layer is likely to shrink to cause voids between the pair of internal electrodes.

For the capacitor of the third kind, it is difficult to form a thin dielectric structure with high thickness precision, and thus capacitance variations are likely to occur due to thickness variations of the dielectric structure. Furthermore, the manufacturing method for the capacitor of the third kind disclosed in U.S. Pat. No. 7,903,387 B2 is unable to form a dielectric structure of $BaTiO_3$.

SUMMARY OF THE INVENTION

It is an object of the present invention to provide a capacitor and its manufacturing method achieving increases in capacitance and reliability.

A capacitor of a first aspect of the present invention includes a dielectric structure formed of a sintered dielectric, a first electrode formed of a conductor, and a second electrode formed of a conductor. The dielectric structure includes at least one continuous wall. The first electrode and the second electrode are insulated from each other by the at least one continuous wall. The at least one continuous wall has a height and a thickness, the height being a dimension in a first direction, the thickness being a dimension in a second direction orthogonal to the first direction, the height being greater than the thickness. The at least one continuous wall has a non-straight shape when seen in the first direction.

The capacitor of the first aspect of the present invention may further include a first terminal electrically connected to the first electrode, and a second terminal electrically connected to the second electrode.

In the capacitor of the first aspect of the present invention, the at least one continuous wall may have a zigzag shape when seen in the first direction.

The capacitor of the first aspect of the present invention may further include a first conductor layer and a second conductor layer located at different positions in the first direction, and a first dielectric layer and a second dielectric layer. In such a case, the dielectric structure and the first and second electrodes are located between the first conductor layer and the second conductor layer. The first electrode is connected to the first conductor layer and the second conductor layer. The first dielectric layer insulates the second electrode from the first conductor layer. The second dielectric layer insulates the second electrode from the second conductor layer.

In the capacitor of the first aspect of the present invention, the at least one continuous wall may be a plurality of walls formed to define a plurality of cavities. In such a case, the first electrode is disposed around the plurality of walls. The second electrode includes a plurality of pillar portions disposed in the plurality of cavities.

When the at least one continuous wall in the capacitor of the first aspect of the present invention is a plurality of walls formed to define a plurality of cavities, the capacitor may further include a first conductor layer and a second conductor layer located at different positions in the first direction, and a first dielectric layer and a second dielectric layer. In such a case, the dielectric structure and the first and second electrodes are located between the first conductor layer and the second conductor layer. One of the first electrode and the second electrode is connected to the first conductor layer. The other of the first electrode and the second electrode is connected to the second conductor layer. The first dielectric layer insulates the other of the first electrode and the second electrode from the first conductor layer. The second dielectric layer insulates the one of the first electrode and the second electrode from the second conductor layer.

Each of the plurality of pillar portions may have a prismatic shape or a cylindrical shape.

In the capacitor of the first aspect of the present invention, the dielectric used to form the dielectric structure may contain $BaTiO_3$. Both of the conductor used to form the first electrode and the conductor used to form the second electrode may contain Ni.

In the capacitor of the first aspect of the present invention, the dielectric structure may include a main portion formed of a first material, and a coating layer formed of a second material different from the first material. The main portion has a side surface intersecting the second direction. The coating layer covers the side surface of the main portion.

A manufacturing method for the capacitor of the first aspect of the present invention includes the step of forming the dielectric structure and the step of forming the first electrode and the second electrode simultaneously after the formation of the dielectric structure.

In the manufacturing method for the capacitor of the first aspect of the present invention, the step of forming the dielectric structure may include the steps of: forming a mask with an opening shaped to correspond to the shape of the dielectric structure; forming an unfired structure by loading the material of the dielectric structure into the opening of the mask, the unfired structure being intended to be fired later into the dielectric structure; and removing the mask after the formation of the unfired structure and firing the unfired structure into the dielectric structure.

In the manufacturing method for the capacitor of the first aspect of the present invention, the dielectric structure may include a main portion formed of a first material, and a coating layer formed of a second material different from the first material. The main portion has a side surface intersecting the second direction. The coating layer covers the side surface of the main portion. In such a case, the step of forming the unfired structure may include the step of forming an unfired coating layer, the unfired coating layer being intended to be fired later into the coating layer, and the step of forming an unfired main portion after the formation of the unfired coating layer, the unfired main portion being intended to be fired later into the main portion.

The capacitor manufactured by the manufacturing method for the capacitor of the first aspect of the present invention may further include a first terminal electrically connected to the first electrode, and a second terminal electrically connected to the second electrode. In such a case, the manufacturing method for the capacitor of the first aspect of the present invention further includes the step of forming the first and second terminals after the formation of the first and second electrodes.

In the manufacturing method for the capacitor of the first aspect of the present invention, the at least one continuous wall may have a zigzag shape when seen in the first direction.

In the manufacturing method for the capacitor of the first aspect of the present invention, the capacitor may further include a first conductor layer and a second conductor layer located at different positions in the first direction, and a first dielectric layer and a second dielectric layer. In such a case, the dielectric structure and the first and second electrodes are located between the first conductor layer and the second conductor layer. The first electrode is connected to the first conductor layer and the second conductor layer. The first dielectric layer insulates the second electrode from the first conductor layer. The second dielectric layer insulates the second electrode from the second conductor layer. In such a case, the manufacturing method for the capacitor further includes the steps of: forming the first conductor layer before the formation of the dielectric structure; forming the first dielectric layer after the formation of the first conductor layer and before the formation of the dielectric structure; forming the second dielectric layer after the formation of the first and second electrodes; and forming the second conductor layer after the formation of the second dielectric layer.

In the manufacturing method for the capacitor of the first aspect of the present invention, the at least one continuous wall may be a plurality of walls formed to define a plurality of cavities. In such a case, the first electrode is disposed around the plurality of walls. The second electrode includes a plurality of pillar portions disposed in the plurality of cavities.

In the manufacturing method for the capacitor of the first aspect of the present invention, when the at least one continuous wall is a plurality of walls formed to define a plurality of cavities, the capacitor may further include a first conductor layer and a second conductor layer located at different positions in the first direction, and a first dielectric layer and a second dielectric layer. In such a case, the dielectric structure and the first and second electrodes are located between the first conductor layer and the second conductor layer. One of the first electrode and the second electrode is connected to the first conductor layer. The other of the first electrode and the second electrode is connected to the second conductor layer. The first dielectric layer insulates the other of the first electrode and the second electrode from the first conductor layer. The second dielectric layer insulates the one of the first electrode and the second electrode from the second conductor layer. In such a case, the manufacturing method for the capacitor further includes the steps of: forming the first conductor layer before the formation of the dielectric structure; forming the first dielectric layer after the formation of the first conductor layer and before the formation of the dielectric structure; forming the second dielectric layer after the formation of the first and second electrodes; and forming the second conductor layer after the formation of the second dielectric layer.

A capacitor of a second aspect of the present invention includes a plurality of layer portions stacked in a first direction. Each of the plurality of layer portions includes a dielectric structure formed of a sintered dielectric, a first electrode formed of a conductor, and a second electrode formed of a conductor. The dielectric structure includes at least one continuous wall. The first electrode and the second electrode are insulated from each other by the at least one continuous wall. The at least one continuous wall has a height and a thickness, the height being a dimension in the first direction, the thickness being a dimension in a second direction orthogonal to the first direction, the height being greater than the thickness. The at least one continuous wall has a non-straight shape when seen in the first direction. The first electrodes of the plurality of layer portions are electrically connected to each other. The second electrodes of the plurality of layer portions are electrically connected to each other.

A manufacturing method for the capacitor of the second aspect of the present invention includes a layer-portion formation step of forming each of the plurality of layer portions. The layer-portion formation step includes the step of forming the dielectric structure, and the step of forming the first electrode and the second electrode simultaneously after the formation of the dielectric structure.

The capacitors of the first and second aspects of the present invention and their manufacturing methods are able to achieve increases in capacitance and reliability of the capacitors.

Other objects, features and advantages of the present invention will become fully apparent from the following description.

DETAILED DESCRIPTION OF THE PREFERRED EMBODIMENTS

First Embodiment

Figure 1:
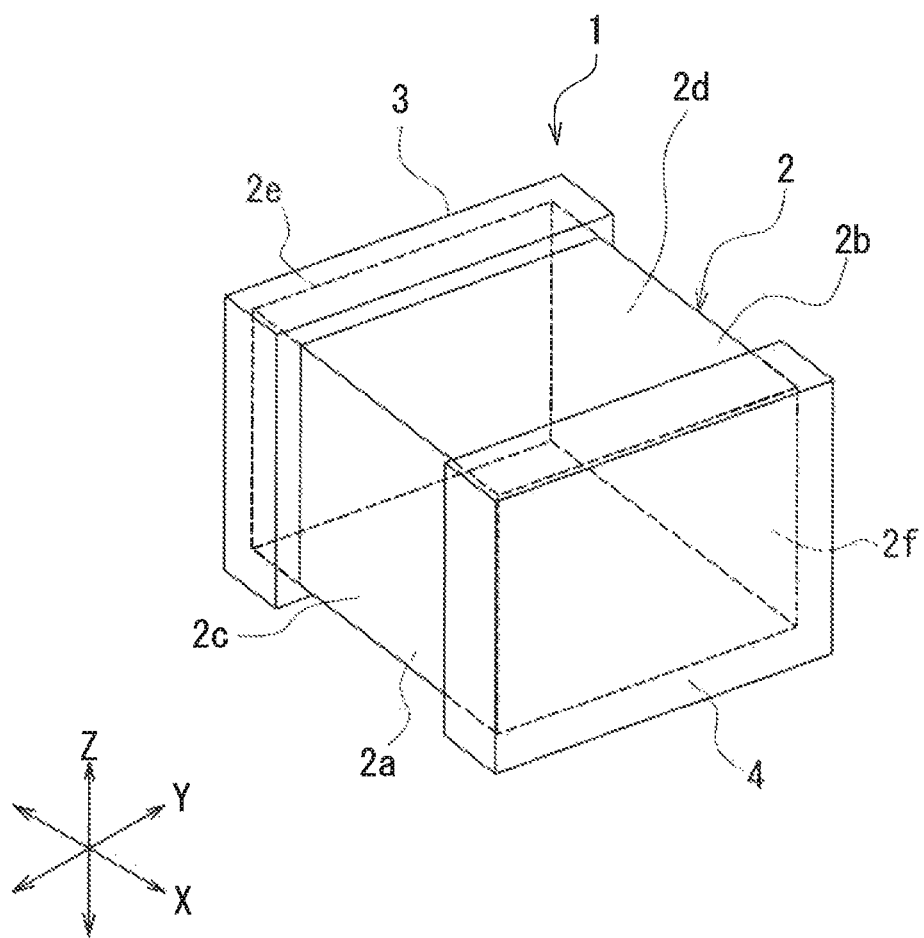
FIG. 1 is a perspective view showing the external appearance of a capacitor according to a first embodiment of the invention.
Figure 2:
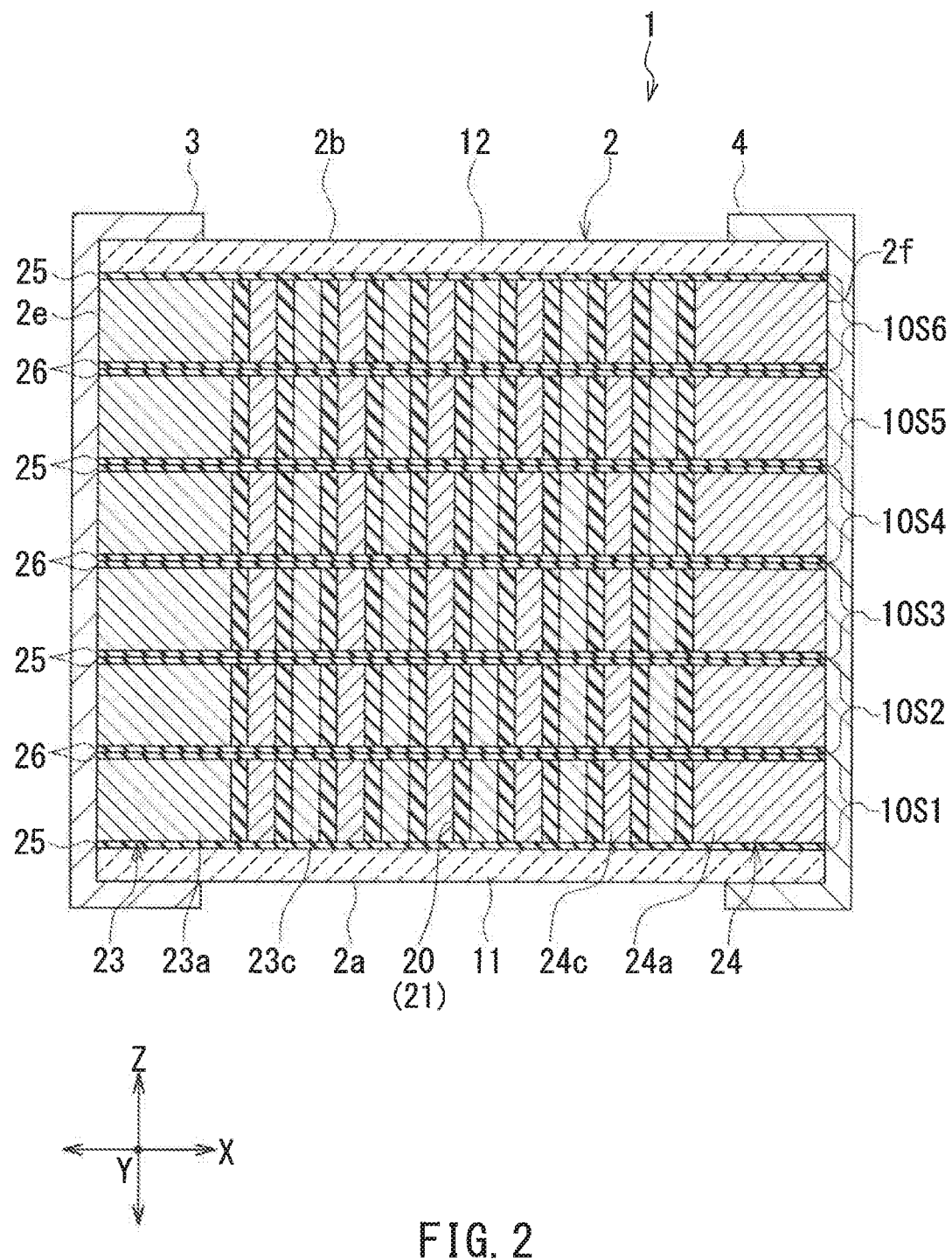
FIG. 2 is a cross-sectional view of the capacitor according to the first embodiment of the invention.

Preferred embodiments of the present invention will now be described in detail with reference to the drawings. First, a description will be given of the configuration of a capacitor according to a first embodiment of the invention. FIG. 1 is a perspective view showing the outer appearance of the capacitor according to the present embodiment. FIG. 2 is a cross-sectional view of the capacitor according to the present embodiment.

As shown in FIG. 1 and FIG. 2, the capacitor according to the present embodiment includes a main body 2, and a first terminal 3 and a second terminal 4 integrated with the main body 2. The first and second terminals 3 and 4 are formed of conductor.

The main body 2 is in the shape of a rectangular solid. The main body 2 has a bottom surface 2a, a top surface 2b, and four side surfaces 2c, 2d, 2e and 2f. The bottom surface 2a and the top surface 2b are opposite to each other. The side surfaces 2c and 2d are opposite to each other. The side surfaces 2e and 2f are opposite to each other.

X, Y and Z directions are defined here as follows. The X direction is perpendicular to the side surfaces 2e and 2f. The Y direction is perpendicular to the side surfaces 2c and 2d. The Z direction is perpendicular to the bottom surface 2a and the top surface 2b. The X, Y and Z directions are orthogonal to each other. The Z direction corresponds to a first direction in the present invention. In FIG. 2, the Y direction is orthogonal to the plane of the drawing.

For the positions of components of the main body 2, the term "above" as used herein refers to positions located in a direction that is parallel to the Z direction and away from the bottom surface 2a with respect to a reference position, and "below" refers to positions located in a direction that is parallel to the Z direction and toward the bottom surface 2a with respect to the reference position. For the surfaces of the components of the main body 2, the term "top surface" as used herein refers to the surface farthest from the bottom surface 2a, and "bottom surface" refers to the surface closest to the bottom surface 2a. Further, for the surfaces of the components of the main body 2, the term "side surface" refers to a surface whose normal direction is non-parallel to the Z direction.

The first terminal 3 covers the entirety of the side surface 2e and respective portions of the bottom, top and side surfaces 2a, 2b, 2c and 2d near the side surface 2e. The second terminal 4 covers the entirety of the side surface 2f and respective portions of the bottom, top and side surfaces 2a, 2b, 2c and 2d near the side surface 2f.

As shown in FIG. 2, the main body 2 includes a first substrate 11 and a second substrate 12 located at different positions in the first direction, i.e., the Z direction, and a plurality of layer portions disposed between the first substrate 11 and the second substrate 12. The second substrate 12 is located above the first substrate 11. The first substrate 11 has a bottom surface constituting the bottom surface 2a of the main body 2, and a top surface opposite thereto. The second substrate 12 has a top surface constituting the top surface 2b of the main body 2, and a bottom surface opposite thereto.

The plurality of layer portions are stacked in the first direction, i.e., the Z direction. FIG. 2 illustrates an example in which the main body 2 includes six layer portions. The number of the layer portions is not limited to six, and may be any number greater than one. The six layer portions shown in FIG. 2 are denoted by reference symbols 10S1, 10S2, 10S3, 10S4, 10S5, and 10S6 in the order from bottom to top. Reference numeral 10 will be used to represent any layer portion.

Figure 3:
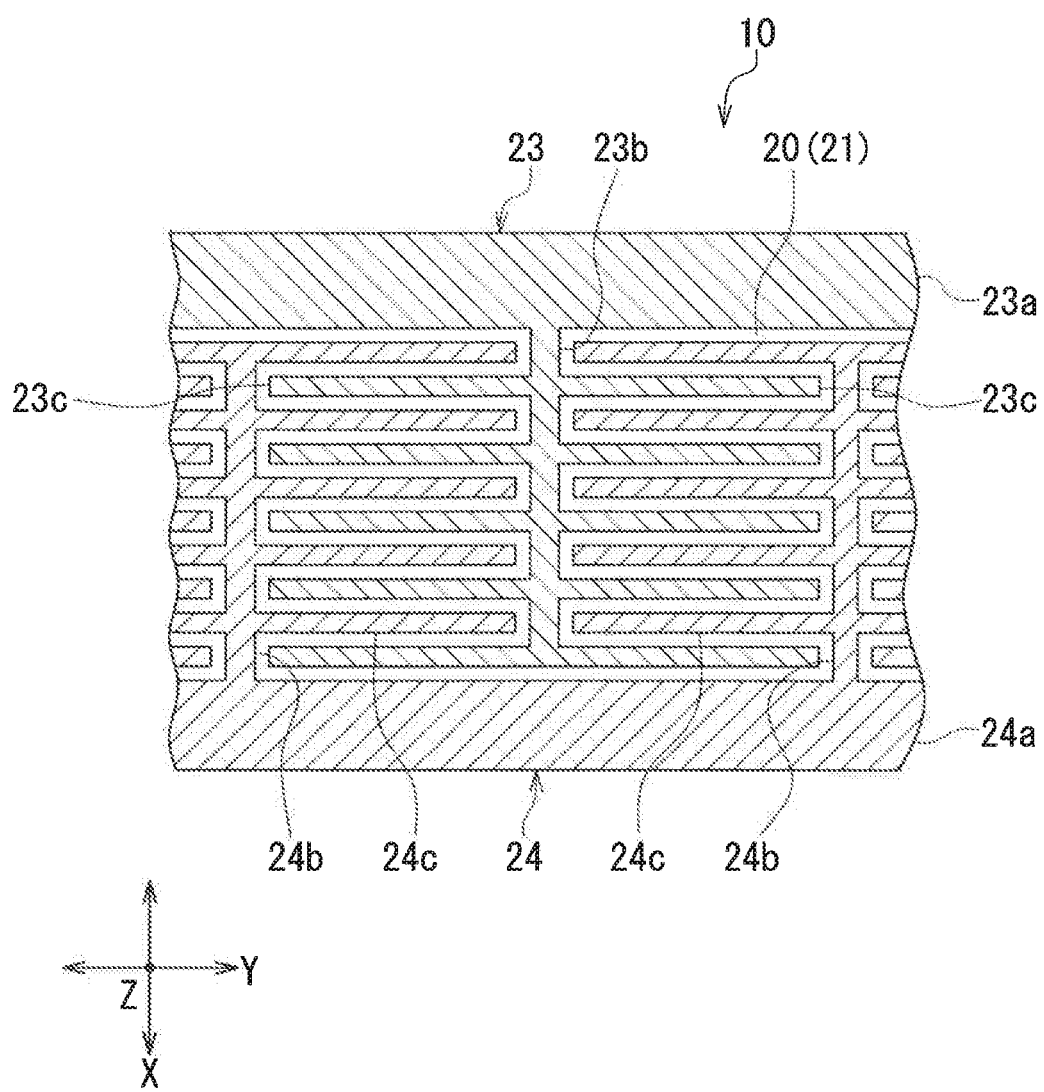
FIG. 3 is a partial plan view of a layer portion of the capacitor shown in FIG. 2.
Figure 4:
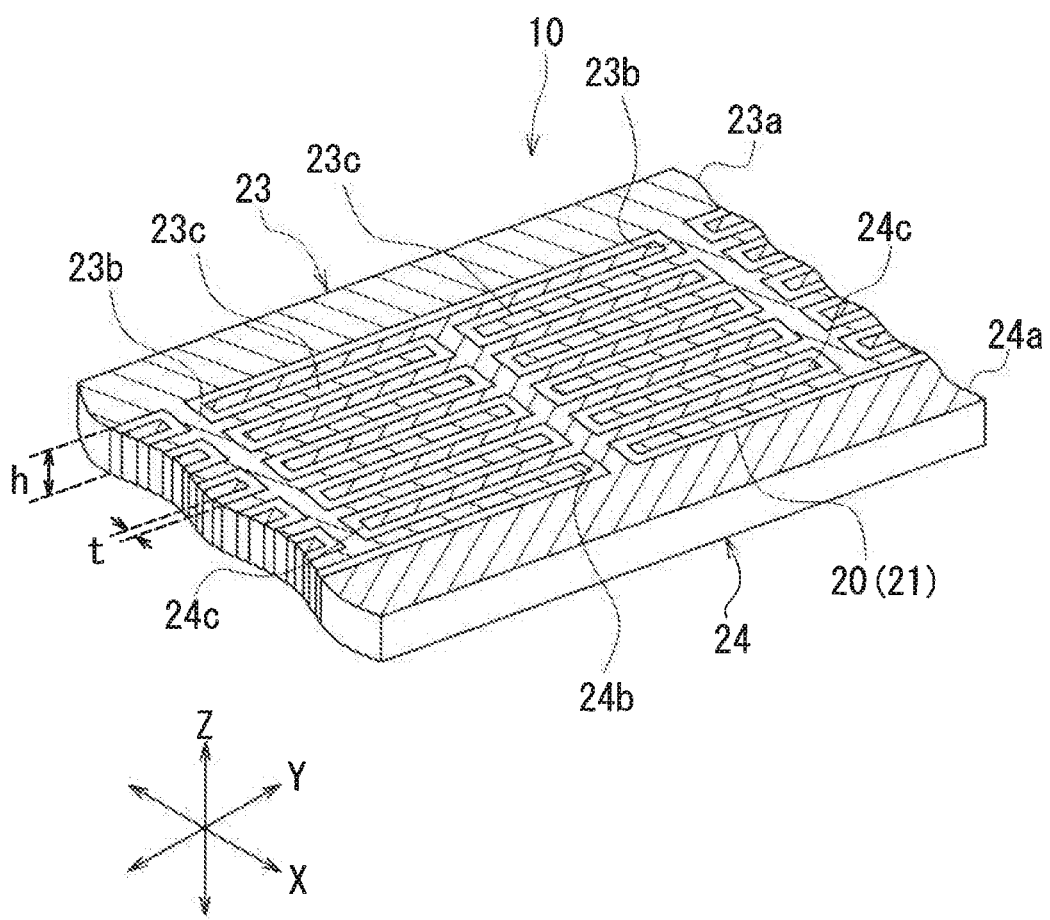
FIG. 4 is a partial perspective view of the layer portion of the capacitor shown in FIG. 2.

The configuration of the layer portion 10 will be described with reference to FIG. 3 and FIG. 4. FIG. 3 is a partial plan view of the layer portion 10. FIG. 4 is a partial perspective view of the layer portion 10.

As shown in FIG. 3 and FIG. 4, the layer portion 10 includes a dielectric structure 20, a first electrode 23, and a second electrode 24. The dielectric structure 20 is formed of a sintered dielectric. Each of the first and second electrodes 23 and 24 is formed of a conductor. For ease of understanding, in FIG. 3 and FIG. 4 the first and second electrodes 23 and 24 are represented with different hatchings.

The dielectric structure 20 includes at least one continuous wall 21. Hereinafter, the continuous wall 21 will be simply referred to as wall 21. In the present embodiment, the dielectric structure 20 includes a single wall 21. The first electrode 23 and the second electrode 24 are insulated from each other by the wall 21.

As shown in FIG. 4, the wall 21 has a height h, which is a dimension in the first direction, i.e., the Z direction, and a thickness t, which is a dimension in a second direction orthogonal to the first direction. The height h is greater than the thickness t. When seen in the first direction, i.e., the Z direction, the wall 21 has a non-straight shape, more specifically, a zigzag shape.

The first electrode 23 includes a base portion 23a, a plurality of trunk portions 23b, and a plurality of sets of branch portions 23c corresponding to the plurality of trunk portions 23b. The base portion 23a has a first side surface constituting part of the side surface 2e of the main body 2, and a second side surface opposite to the first side surface. The plurality of trunk portions 23b protrude from the second side surface of the base portion 23a and extend in the X direction. Each of the plurality of trunk portions 23b has a first side surface and a second side surface located at opposite ends in the Y direction. Each set of branch portions 23c includes a plurality of branch portions 23c protruding from the first side surface of a corresponding one of the trunk portions 23b and extending in the Y direction, and another plurality of branch portions 23c protruding from the second side surface of the corresponding one of the trunk portions 23b and extending in the Y direction.

Likewise, the second electrode 24 includes a base portion 24a, a plurality of trunk portions 24b, and a plurality of sets of branch portions 24c corresponding to the plurality of trunk portions 24b. The base portion 24a has a first side surface constituting part of the side surface 2f of the main body 2, and a second side surface opposite to the first side surface. The plurality of trunk portions 24b protrude from the second side surface of the base portion 24a and extend in the X direction. Each of the plurality of trunk portions 24b has a first side surface and a second side surface located at opposite ends in the Y direction. Each set of branch portions 24c includes a plurality of branch portions 24c protruding from the first side surface of a corresponding one of the trunk portions 24b and extending in the Y direction, and another plurality of branch portions 24c protruding from the second side surface of the corresponding one of the trunk portions 24b and extending in the Y direction.

The dielectric structure 20 is located between the second side surface of the base portion 23a and the second side surface of the base portion 24a. The branch portions 23c and the branch portions 24c are arranged to interdigitate each other with the wall 21 therebetween.

As shown in FIG. 2, the layer portion 10 further includes dielectric films 25 and 26 each of which is formed of a dielectric. The dielectric films 25 and 26 are located at different positions in the first direction, i.e., the Z direction. The dielectric structure 20 and the first and second electrodes 23 and 24 are located between the dielectric film 25 and the dielectric film 26.

In the layer portions 10S1, 10S3 and 10S5, the dielectric film 26 is located above the dielectric film 25, whereas in the layer portions 10S2, 10S4 and 10S6, the dielectric film 25 is located above the dielectric film 26. This difference results from the manufacturing method for the capacitor 1 to be described later. There is no substantial difference between the dielectric films 25 and 26.

The dielectric used to form the dielectric structure 20 may contain at least one of $BaTiO_3$, $SrTiO_3$, $Pb(Zr, Ti)O_3$, $Al_2O_3$, $SiO_2$, and $Ta_2O_5$. In particular, the dielectric used to form the dielectric structure 20 preferably contains $BaTiO_3$.

The dielectric used to form each of the dielectric films 25 and 26 may be the same as or different from the dielectric used to form the dielectric structure 20.

All of the conductor used to form the first electrode 23, the conductor used to form the second electrode 24, the conductor used to form the first terminal 3, and the conductor used to form the second terminal 4 may contain at least one of Ni, Cu, Au, Ag, and Al. When the dielectric used to form the dielectric structure 20 contains $BaTiO_3$ as its principal component, both of the conductor used to form the first electrode 23 and the conductor used to form the second electrode 24 preferably contain Ni as their principal component. This can prevent the occurrence of cracks in the dielectric structure 20 because $BaTiO_3$ and Ni have thermal expansion coefficients that are relatively close in value.

As shown in FIG. 2, the first terminal 3 is in contact with the first side surface of the base portion 23a of the first electrode 23 of each of the layer portions 10S1, 10S2, 10S3, 10S4, 10S5 and 10S6. The first electrodes 23 of the layer portions 10S1, 10S2, 10S3, 10S4, 10S5 and 10S6 and the first terminal 3 are thereby electrically connected to each other.

Likewise, the second terminal 4 is in contact with the first side surface of the base portion 24a of the second electrode 24 of each of the layer portions 10S1, 10S2, 10S3, 10S4, 10S5 and 10S6. The second electrodes 24 of the layer portions 10S1, 10S2, 10S3, 10S4, 10S5 and 10S6 and the second terminal 4 are thereby electrically connected to each other.

In each single layer portion 10, the first electrode 23 and the second electrode 24 face each other with the wall 21 therebetween. This forms a partial capacitor, which is a capacitor formed by each single layer portion 10. A plurality of partial capacitors formed by the plurality of layer portions 10 are connected in parallel to constitute the capacitor 1. If the plurality of partial capacitors formed by the plurality of layer portions 10 have equal capacitances and the number of the layer portions 10 included in the capacitor 1 is N, then the capacitance of the capacitor 1 is N times the capacitance of the partial capacitor.

A manufacturing method for the capacitor 1 according to the present embodiment will now be described. The manufacturing method for the capacitor 1 includes a layer-portion formation step of forming each of the plurality of layer portions 10. The layer-portion formation step will be described first.

The layer-portion formation step includes the step of forming the dielectric structure 20, and the step of forming the first electrode 23 and the second electrode 24 simultaneously after the formation of the dielectric structure 20.

Figure 5:
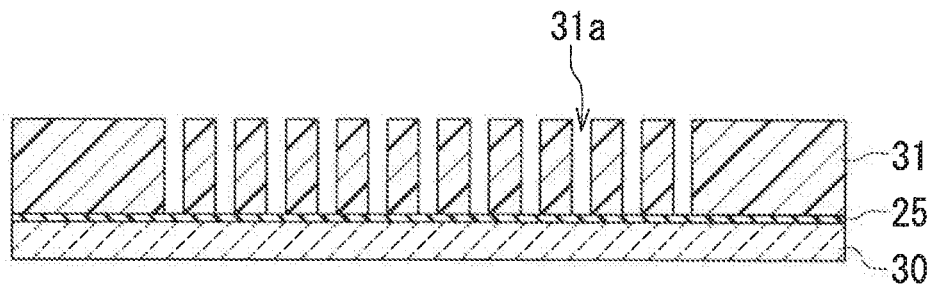
FIG. 5 is a cross-sectional view showing a step of a manufacturing method for the capacitor according to the first embodiment of the invention.
Figure 6:
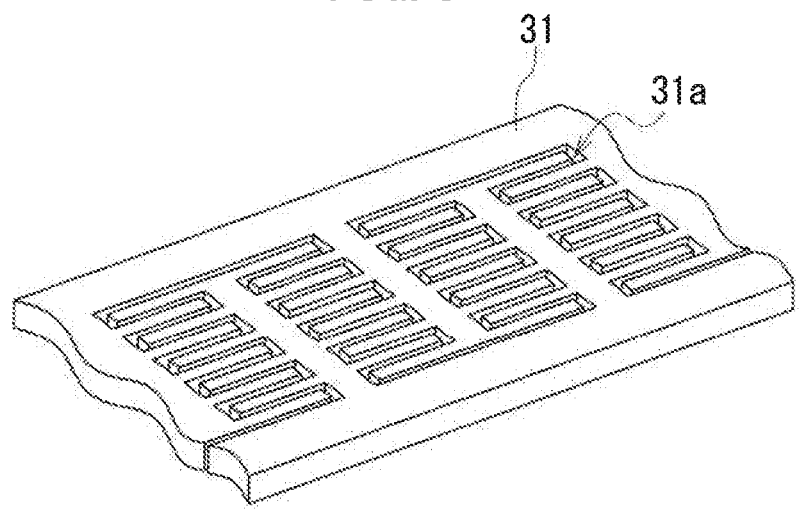
FIG. 6 is a partial perspective view of the mask shown in FIG. 5.

FIG. 5 is a cross-sectional view showing a step of the manufacturing method for the capacitor 1. In the step of forming the dielectric structure 20, first, the dielectric film 25 is formed on a substrate 30 such as a silicon substrate, as shown in FIG. 5. Then, a mask 31 is formed on the dielectric film 25, the mask 31 having an opening 31a shaped to correspond to the shape of the dielectric structure 20 to be formed later. The mask 31 is formed by patterning a photoresist layer by photolithography, for example. FIG. 6 is a partial perspective view of the mask 31.

Figure 7:
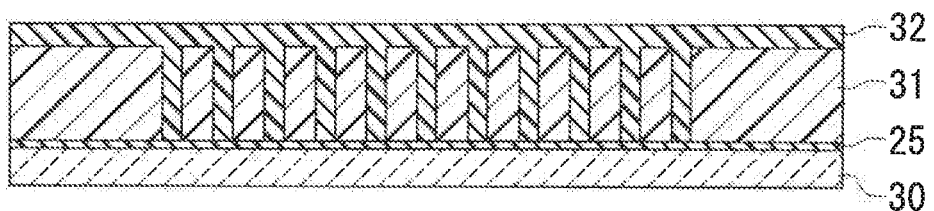
FIG. 7 is a cross-sectional view showing a step that follows the step of FIG. 5.
Figure 8:
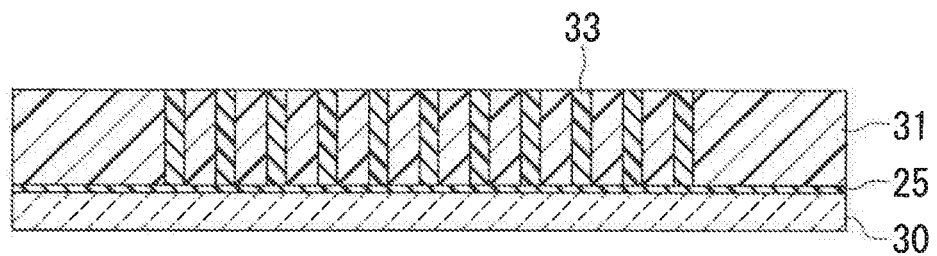
FIG. 8 is a cross-sectional view showing a step that follows the step of FIG. 7.

Next performed is the step of forming an unfired structure by loading the material of the dielectric structure 20 into the opening 31a of the mask 31. The unfired structure is to be fired later into the dielectric structure 20. FIG. 7 and FIG. 8 illustrate this step. An example of the material of the dielectric structure 20 used in this step is slurry 32 containing ultra-fine particles of a dielectric such as $BaTiO_3$. For example, spray coating is employed to load the slurry 32 into the opening 31a of the mask 31. The spray coating process in this step may be performed in a vacuum or a reduced-pressure atmosphere containing a necessary gas, or with the substrate 30 heated.

FIG. 7 illustrates a state in which the mask 31 has been coated with the slurry 32 by spray coating. When in this state, the applied slurry 32 includes a portion filling the opening 31a of the mask 31 and a portion extending out of the opening 31a. In the step of forming the unfired structure, the slurry 32 shown in FIG. 7 is then heat-treated at temperatures within the range of 100° C. to 200° C., for example. The slurry 32 is thereby solidified into an initial structure. The initial structure includes a portion present in the opening 31a of the mask 31 and a portion extending out of the opening 31.

In the step of forming the unfired structure, the portion of the initial structure extending out of the opening 31a of the mask 31 is then removed as shown in FIG. 8 by ion beam etching (hereinafter referred to as IBE) or chemical mechanical polishing (hereinafter referred to as CMP), for example. As a result, only the portion of the initial structure present in the opening 31a of the mask 31 remains to constitute the unfired structure 33.

Figure 9:
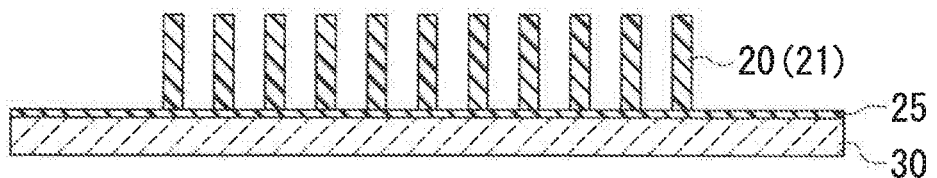
FIG. 9 is a cross-sectional view showing a step that follows the step of FIG. 8.

FIG. 9 illustrates a step after the formation of the unfired structure 33. In this step, the mask 31 is removed and the unfired structure 33 is fired into the dielectric structure 20. This step may employ a first method in which the removal of the mask 31 and the firing of the unfired structure 33 are performed at the same time or a second method in which the unfired structure 33 is fired after the removal of the mask 31.

In the first method, for example, the mask 31 and the unfired structure 33 are subjected to a heat treatment in which their temperatures are gradually raised from temperatures within the range of 100° C. to 200° C. to temperatures within the range of 900° C. to 1200° C. This heat treatment causes the mask 31 formed of, e.g., a photoresist, to disappear and causes the unfired structure 33 to be fired into the dielectric structure 20.

The heat treatment may be performed in an atmosphere containing oxygen gas. By doing so, the mask 31 is allowed to completely disappear.

In the second method, the mask 31 is removed first. Then, the unfired structure is subjected to a heat treatment to gradually raise its temperature from a temperature within the range of 100° C. to 200° C. to a temperature within the range of 900° C. to 1200° C. The unfired structure 33 is thereby fired into the dielectric structure 20.

In either of the first and second methods, firing the unfired structure 33 by a heat treatment to gradually raise its temperature prevents breakage of the dielectric structure 20. Further, performing such a heat treatment in an atmosphere containing a plurality of gases such as oxygen, nitrogen, hydrogen, argon, helium and neon at an appropriate ratio enables an increase in the permittivity of the dielectric structure 20.

Figure 10:
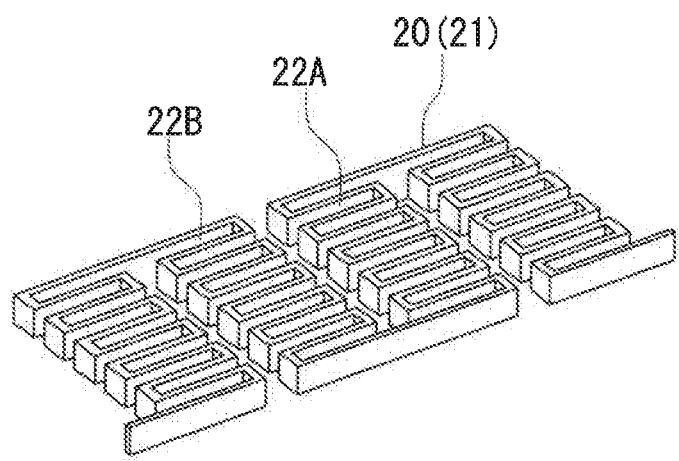
FIG. 10 is a partial perspective view of the dielectric structure shown in FIG. 9.

FIG. 10 is a partial perspective view of the dielectric structure 20. As shown in FIG. 10, the dielectric structure 20 includes the wall 21 of a zigzag shape, thus forming first accommodation sections 22A for accommodating the plurality of trunk portions 23b and the plurality of sets of branch portions 23c of the first electrode 23, and second accommodation sections 22B for accommodating the plurality of trunk portions 24b and the plurality of sets of branch portions 24c of the second electrode 24.

A series of steps shown in FIG. 5 through FIG. 10 correspond to the step of forming the dielectric structure 20.

Figure 11:
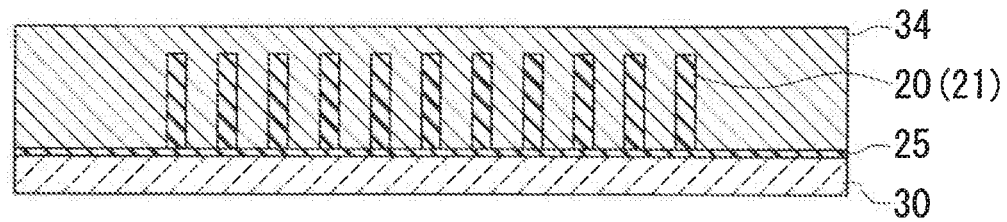
FIG. 11 is a cross-sectional view showing a step that follows the step of FIG. 9.
Figure 12:
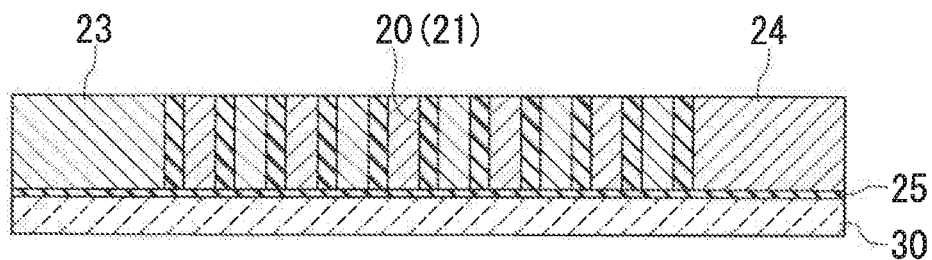
FIG. 12 is a cross-sectional view showing a step that follows the step of FIG. 11.
Figure 13:
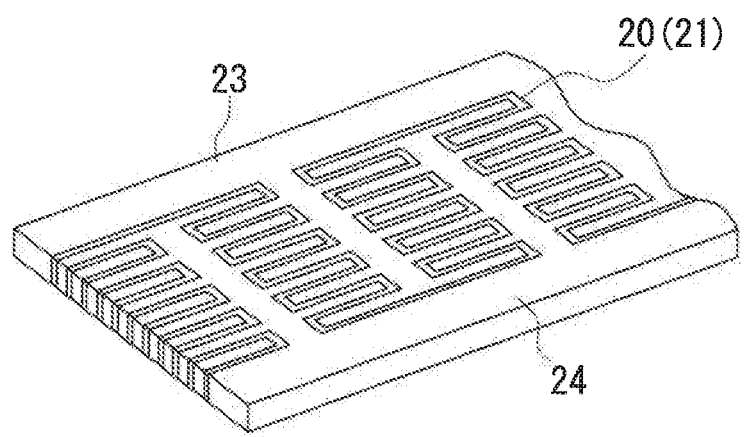
FIG. 13 is a perspective view showing respective portions of the dielectric structure, the first electrode and the second electrode shown in FIG. 12.

FIG. 11 to FIG. 13 illustrate the step of forming the first electrode 23 and the second electrode 24 simultaneously after the formation of the dielectric structure 20. In this step, first, as shown in FIG. 11, a conductor film 34 of a conductor is formed to cover the dielectric structure 20 by plating, for example.

Next, as shown in FIG. 12, the conductor film 34 is polished by, for example, CMP, until the dielectric structure 20 becomes exposed. This divides the conductor film 34 into two portions insulated from each other by the wall 21. One of the two portions is the first electrode 23, and the other is the second electrode 24. In this way, the first electrode 23 and the second electrode 24 are formed simultaneously. FIG. 13 is a perspective view showing respective portions of the dielectric structure 20, the first electrode 23 and the second electrode 24 shown in FIG. 12.

As described above, the two portions of the polished conductor film 34 constitute the first electrode 23 and the second electrode 24. The first electrode 23 and the second electrode 24 are thus formed of the same material. For ease of understanding, in FIG. 12 the first electrode 23 and the second electrode 24 are represented with different hatchings.

Figure 14:
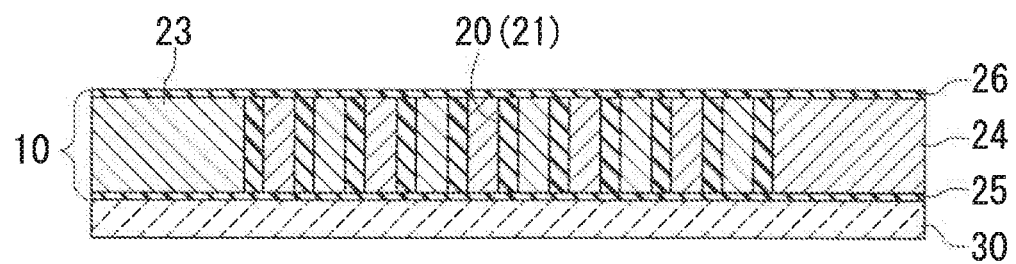
FIG. 14 is a cross-sectional view showing a step that follows the step of FIG. 12.

In the layer-portion formation step, after the formation of the first and second electrodes 23 and 24, the dielectric film 26 is formed to cover the dielectric structure 20, the first electrode 23 and the second electrode 24 as shown in FIG. 14. This produces a first substructure in which the layer portion 10 lies on the substrate 30.

Next, a description will be given of the step of forming the main body 2 by stacking a plurality of layer portions 10. In the step of forming the main body 2, first, as shown in FIG. 15, two first substructures shown in FIG. 14 are prepared and bonded together with, for example, an adhesive, with the respective dielectric films 26 of the two first substructures allowed to face each other.

Figure 15:
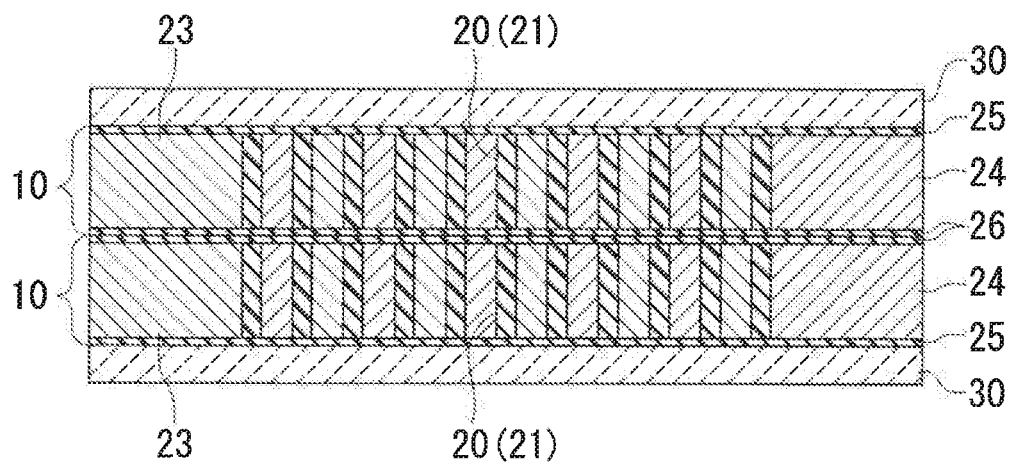
FIG. 15 is a cross-sectional view showing a step of stacking two layer portions.
Figure 16:
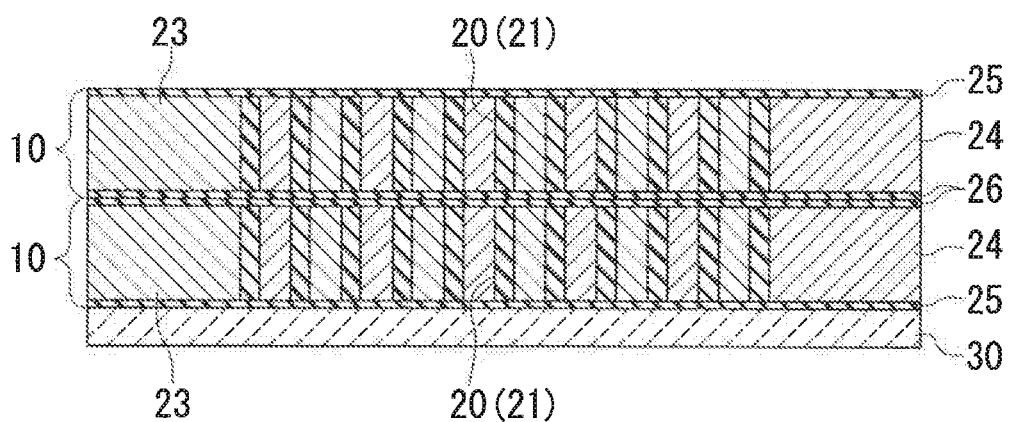
FIG. 16 is a cross-sectional view showing a step that follows the step of FIG. 15.

Next, as shown in FIG. 16, one of the substrates 30 is removed from the layered structure shown in FIG. 15. This produces a second substructure in which two layer portions 10 are stacked on the remaining substrate 30.

Figure 17:
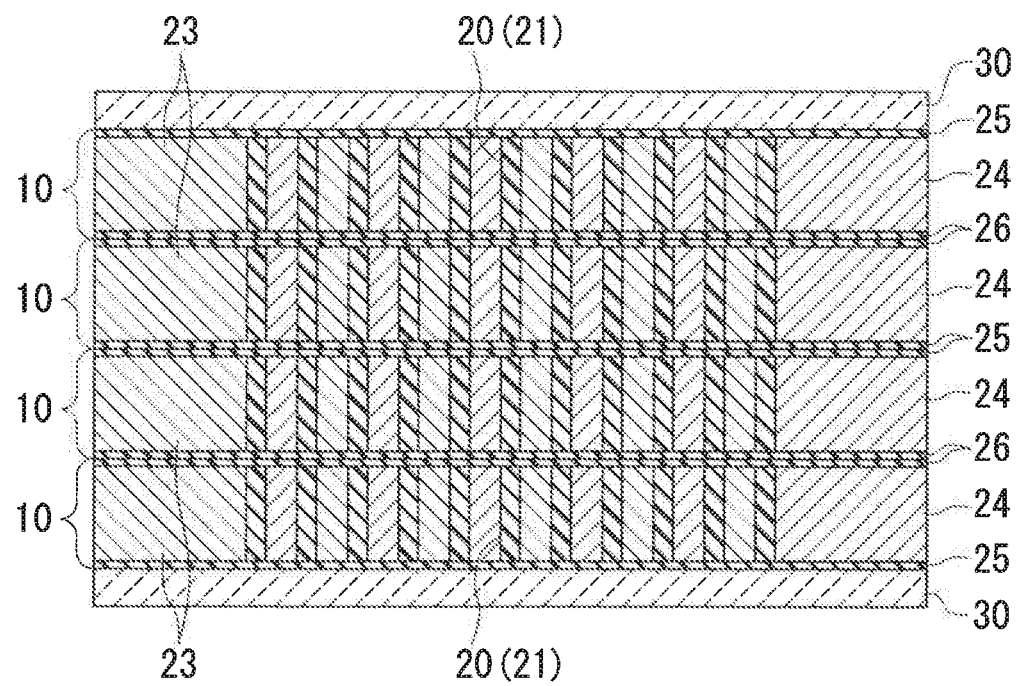
FIG. 17 is a cross-sectional view showing a step of stacking four layer portions.

Next, as shown in FIG. 17, two second substructures shown in FIG. 16 are prepared and bonded together with, for example, an adhesive, with the respective dielectric films 25 of the two second substructures allowed to face each other.

Then, one of the substrates 30 is removed from the layered structure shown in FIG. 17. This produces a third substructure in which four layer portions 10 are stacked on the remaining substrate 30.

Next, although not illustrated, the third substructure and another second substructure are prepared and bonded together with, for example, an adhesive, with the respective dielectric films 25 of the third substructure and the second substructure allowed to face each other. This produces a layered structure in which six layer portions 10 are stacked between two substrates 30. This layered structure is the main body 2 shown in FIG. 2. One of the two substrates 30 of this layered structure serves as the first substrate 11 of the main body 2, and the other serves as the second substrate 12 of the main body 2.

The manufacturing method for the capacitor 1 completes the capacitor 1 shown in FIG. 2 by forming the first terminal 3 and the second terminal 4 on the main body 2 formed in the above-described manner.

Figure 18:
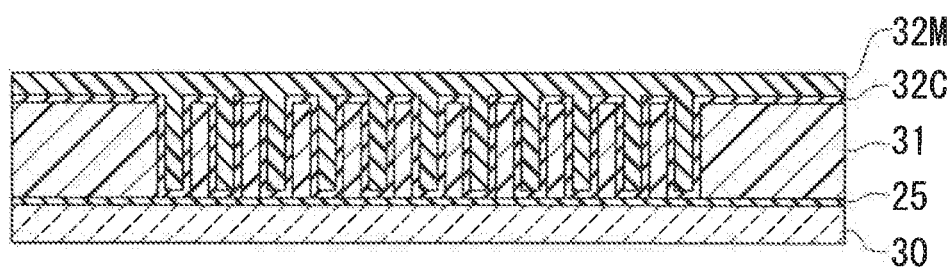
FIG. 18 is a cross-sectional view showing a step of a manufacturing method for a modification example of the capacitor according to the first embodiment of the invention.
Figure 19:
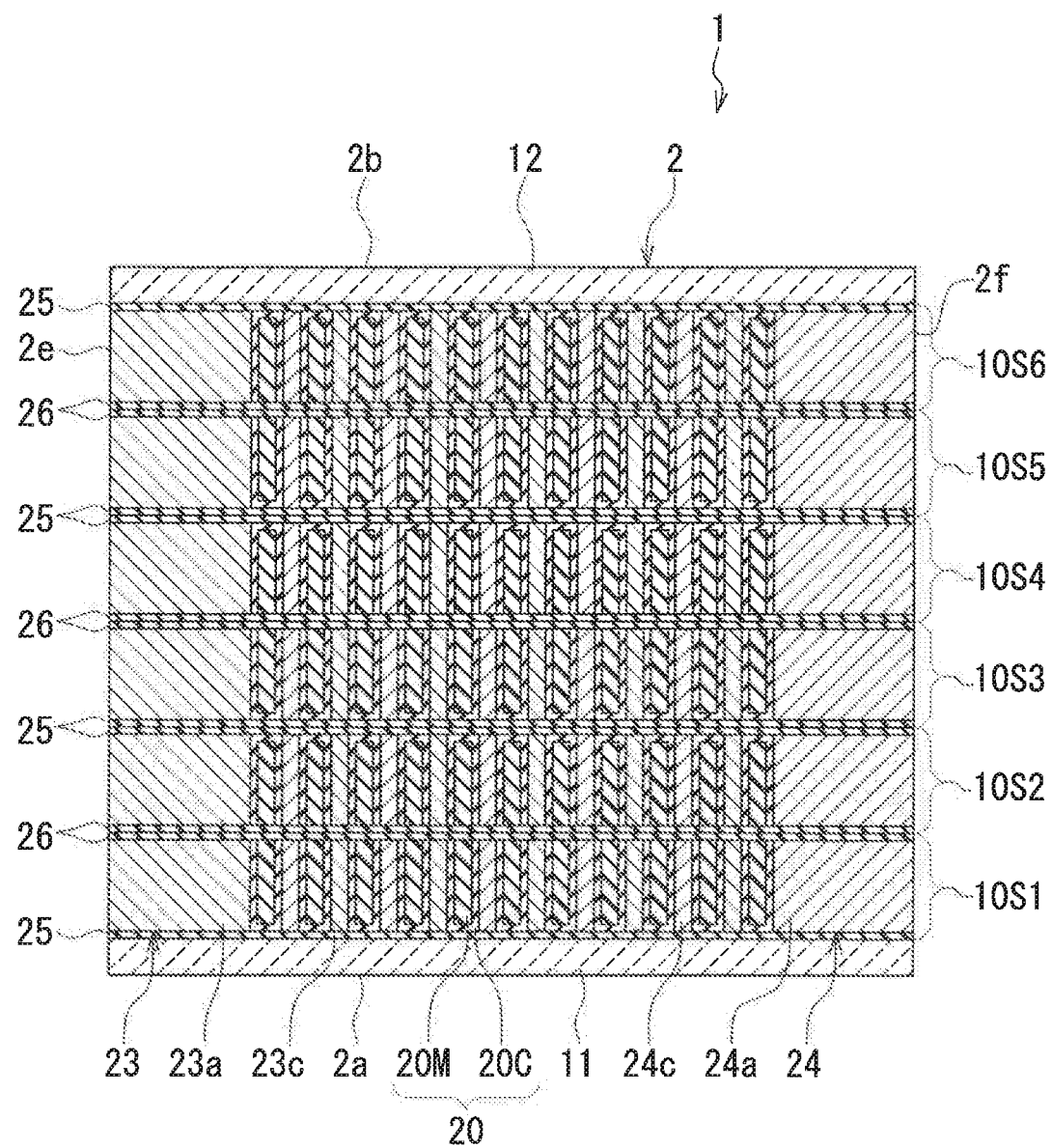
FIG. 19 is a cross-sectional view showing a main body of the modification example of the capacitor according to the first embodiment of the invention.

Reference is now made to FIG. 18 and FIG. 19 to describe a modification example of the capacitor 1 and its manufacturing method according to the present embodiment.

First, the configuration of the main body 2 of the modification example will be described with reference to FIG. 19. In the modification example, the dielectric structure 20 includes a main portion 20M formed of a first material, and a coating layer 20C formed of a second material different from the first material. The main portion 20M has a side surface intersecting the second direction mentioned previously. The coating layer 20C covers the side surface of the main portion 20M.

The second material is preferably a material that is less prone to cracking than the first material. The first material may contain at least one of $BaTiO_3$, $SrTiO_3$, and $Pb(Zr,Ti)O_3$. The second material may contain at least one of $Al_2O_3$, $SiO_2$, and $Ta_2O_5$.

The step of forming the unfired structure 33 of the modification example will be described with reference to FIG. 18. FIG. 18 illustrates a step after the formation of the mask 31 on the dielectric film 25. In the step of forming the unfired structure 33 of the modification example, as shown in FIG. 18, first formed is an unfired coating layer 32C after the formation of the mask 31. The unfired coating layer 32C will be fired later into the coating layer 20C. The unfired coating layer 32C is formed not to fill the opening 31a (see FIG. 5 and FIG. 6) of the mask 31, but to extend thinly along the outer surface of the mask 31 defining the opening 31a. The unfired coating layer 32C is formed by atomic layer deposition, for example.

In the opening 31a of the mask 31, the unfired coating layer 32C defines a space narrower than the opening 31a. Then, an unfired main portion 32M, which will be fired later into the main portion 20M, is formed to fill the space. A method of forming the unfired main portion 32M is the same as the method of loading the slurry 32 into the opening 31a described with reference to FIG. 7.

In the modification example, the unfired coating layer 32C and the unfired main portion 32M are then heat-treated at temperatures within the range of 100° C. to 200° C., for example. This makes the unfired coating layer 32C and the unfired main portion 32M into an initial structure. Then, the step of FIG. 8 is performed to form the unfired structure 33 of the modification example.

The subsequent steps of the modification example are the same as the series of steps described with reference to FIG. 9 through FIG. 17.

The descriptions so far have dealt with the case where the main body 2 of the capacitor 1 includes a plurality of layer portions 10. However, the capacitor 1 according to the present embodiment may be one in which the main body 2 includes only a single layer portion 10.

The capacitor 1 according to the present embodiment includes the dielectric structure 20 formed of a sintered dielectric, and the first electrode 23 and the second electrode 24. The dielectric structure 20 includes the wall 21. The first electrode 23 and the second electrode 24 are insulated from each other by the wall 21.

When seen in the first direction, i.e., the Z direction, the wall 21 has a non-straight shape, more specifically, a zigzag shape. Thus, the dielectric structure 20 is resistant to cracking even when subjected to stress due to heat or an external force.

Further, the present embodiment allows an increase in the area of the respective surfaces of the first electrode 23 and the second electrode 24 that face each other with the wall 21 therebetween. An increase in the capacitance of the capacitor 1 is thereby achieved.

Further, according to the present embodiment, the first electrode 23 and the second electrode 24 are formed after the completion of the dielectric structure 20 formed of a sintered dielectric. Once the dielectric structure 20 has been completed, no voids are created in the dielectric structure 20. The present embodiment thus prevents the formation of voids between the first electrode 23 and the second electrode 24.

By virtue of the foregoing, the present embodiment provides the capacitor 1 with increased capacitance and reliability.

According to the modification example shown in FIG. 18 and FIG. 19, by selecting the second material for forming the coating layer 20C from materials that are less prone to cracking than the first material for forming the main portion 20M, the dielectric structure 20 becomes less prone to cracking than in the case where the entire dielectric structure 20 is formed of the first material.

Second Embodiment

Figure 20:
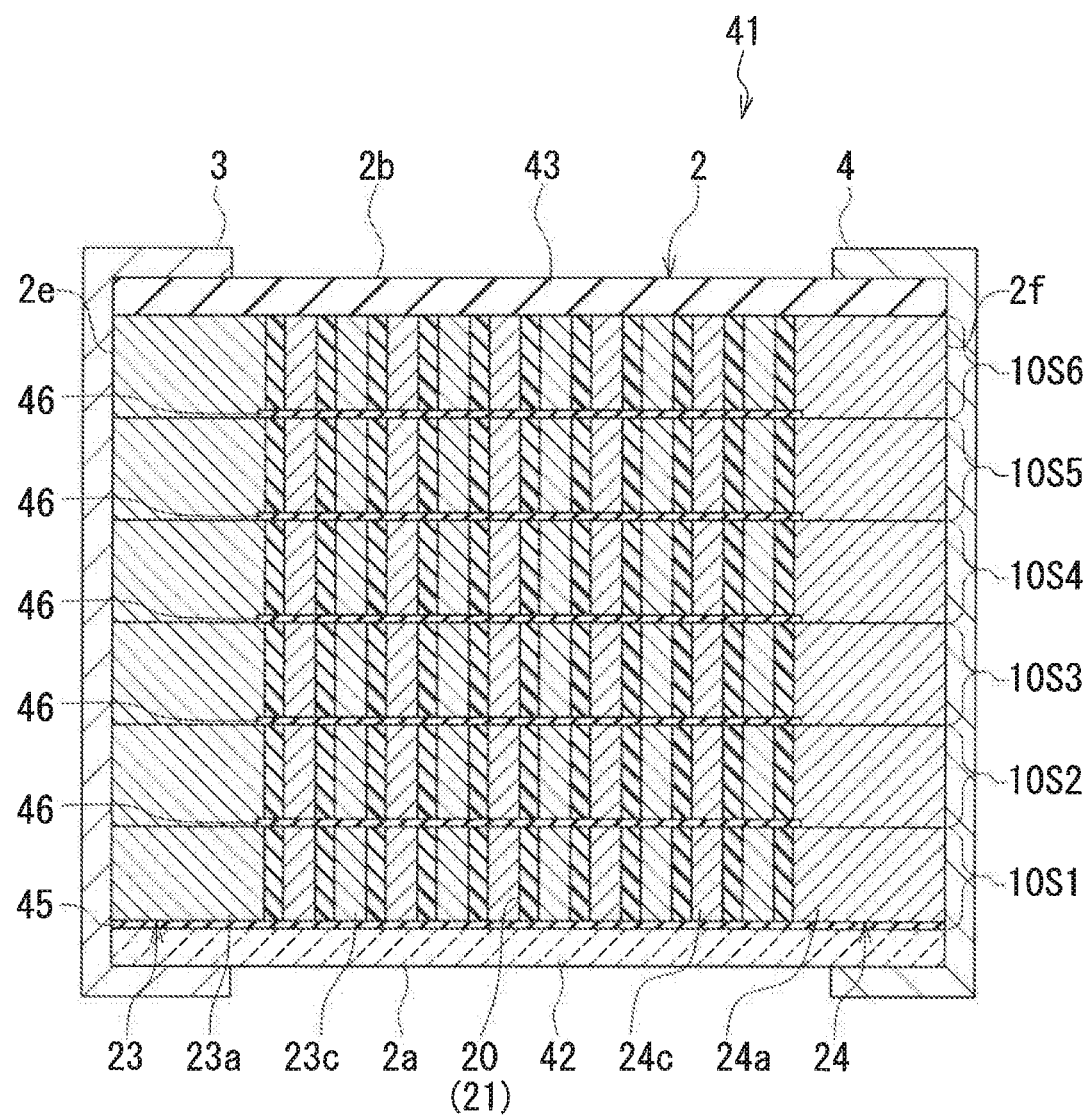
FIG. 20 is a cross-sectional view of a capacitor according to a second embodiment of the invention.

A second embodiment of the invention will now be described. First, reference is made to FIG. 20 to describe the configuration of a capacitor 41 according to the present embodiment. FIG. 20 is a cross-sectional view of the capacitor 41 according to the present embodiment. The capacitor 41 includes a main body 2, a first terminal 3 and a second terminal 4, as in the first embodiment.

The main body 2 of the present embodiment has the same shape as the main body 2 of the first embodiment. The main body 2 of the present embodiment includes a substrate 42 having a top surface, a plurality of layer portions stacked on the top surface of the substrate 42, and a dielectric layer 43 lying on the uppermost layer portion.

FIG. 20 illustrates an example in which the main body 2 includes six layer portions 10S1, 10S2, 10S3, 10S4, 10S5, and 10S6, which are listed in the order from bottom to top. The number of the layer portions is not limited to six, and may be any number greater than one.

The lowermost layer portion 10S1 includes a dielectric layer 45 covering the entire top surface of the substrate 42, a dielectric structure 20 lying on the dielectric layer 45, a first electrode 23, and a second electrode 24. Each of the layer portions 10S2 to 10S6 includes a dielectric layer 46, and a dielectric structure 20, a first electrode 23 and a second electrode 24 lying on the dielectric layer 46. The configurations of the dielectric structure 20, the first electrode 23 and the second electrode 24 are the same as those in the first embodiment.

Each dielectric layer 46 covers at least the dielectric structure 20, the plurality of trunk portions 23b and the plurality of sets of branch portions 23c of the first electrode 23, and the plurality of trunk portions 24b and the plurality of sets of branch portions 24c of the second electrode 24 of the layer portion lying under the dielectric layer 46.

In the example shown in FIG. 20, each dielectric layer 46 does not cover at least part of the base portion 23a of the first electrode 23 and at least part of the base portion 24a of the second electrode 24 of the layer portion lying under the dielectric layer 46. In this case, every vertically adjacent two layer portions are configured so that the base portions 23a of the respective first electrodes 23 are in contact with each other and the base portions 24a of the respective second electrodes 24 are in contact with each other. Alternatively, each dielectric layer 46 may cover the entire top surface of the layer portion lying under the dielectric layer 46.

A manufacturing method for the capacitor 41 according to the present embodiment will now be described with reference to FIG. 21 and FIG. 22. In the manufacturing method for the capacitor 41, the dielectric layer 45 is formed on the substrate 42. Then, the dielectric structure 20, the first electrode 23 and the second electrode 24 of the layer portion 10S1 are formed on the dielectric layer 45 to complete the layer portion 10S1. The dielectric structure 20, the first electrode 23 and the second electrode 24 are formed by the same method as in the first embodiment.

Next, the dielectric layer 46 is formed on the layer portion 10S1. Then, the dielectric structure 20, the first electrode 23 and the second electrode 24 of the layer portion 10S2 are formed on the layer portion 10S1 and the dielectric layer 46 to complete the layer portion 10S2. The dielectric structure 20, the first electrode 23 and the second electrode 24 are formed by the same method as in the first embodiment.

Figure 21:
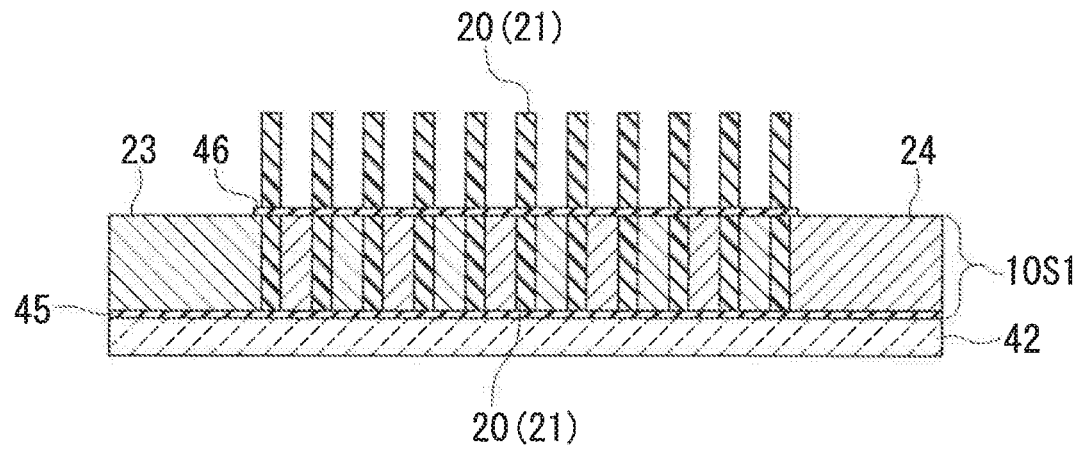
FIG. 21 is a cross-sectional view showing a step of a manufacturing method for the capacitor according to the second embodiment of the invention.
Figure 22:
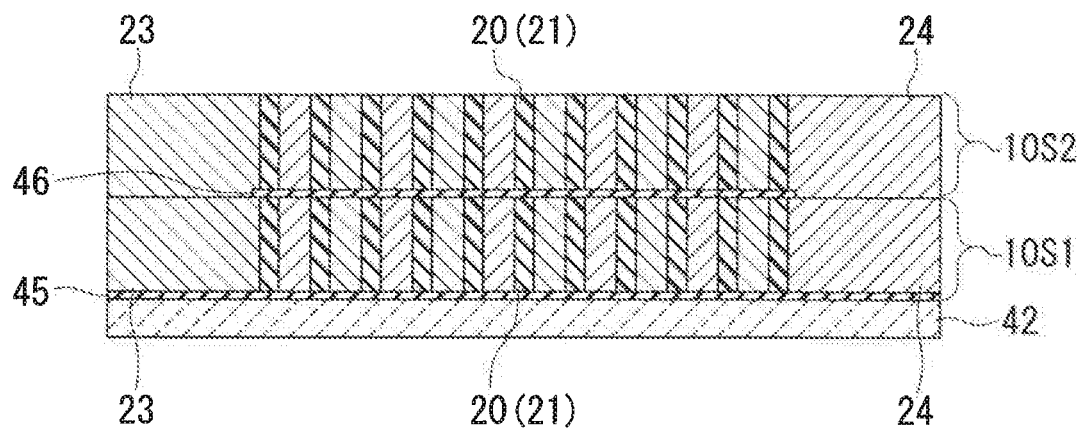
FIG. 22 is a cross-sectional view showing a step that follows the step of FIG. 21.

FIG. 21 illustrates a state after the formation of the dielectric structure 20 of the layer portion 10S2. FIG. 22 illustrates a state after the formation of the first electrode 23 and the second electrode 24 of the layer portion 10S2.

In the manufacturing method for the capacitor 41, after the formation of the layer portion 10S2, the layer portions 10S3 to 10S6 are formed one by one using the same method as that of forming the layer portion 10S2. Then, the dielectric layer 43 is formed on the layer portion 10S6 to complete the main body 2. The manufacturing method for the capacitor 41 completes the capacitor 41 shown in FIG. 20 by forming the first terminal 3 and the second terminal 4 on the main body 2 formed in the above-described manner.

The dielectric structure 20 of the present embodiment may be replaced with the dielectric structure 20 of the modification example of the first embodiment.

The remainder of configuration, function and effects of the present embodiment are the same as those of the first embodiment.

Third Embodiment

Figure 23:
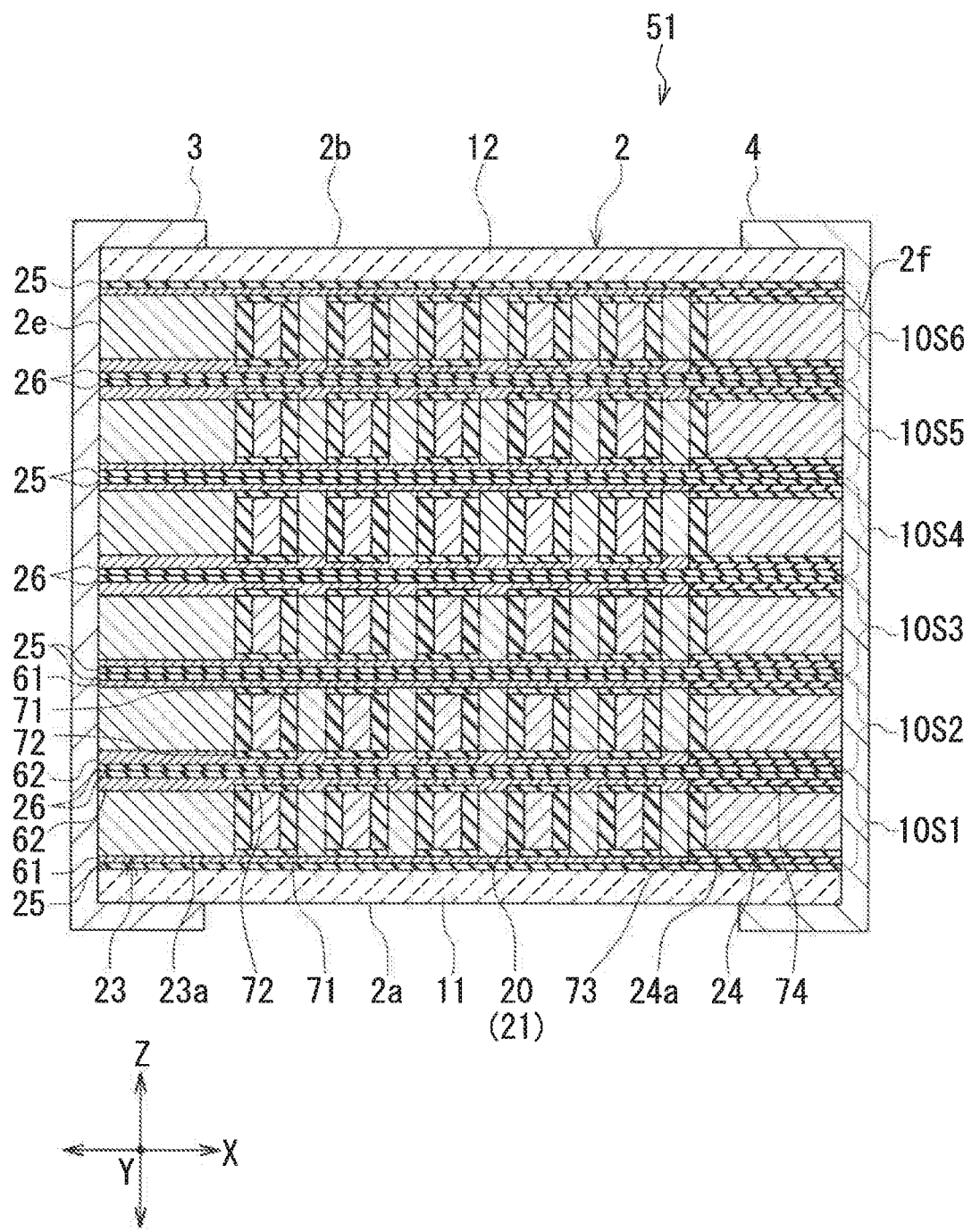
FIG. 23 is a cross-sectional view of a capacitor according to a third embodiment of the invention.

A third embodiment of the invention will now be described. First, reference is made to FIG. 23 to describe the configuration of a capacitor 51 according to the present embodiment. FIG. 23 is a cross-sectional view of the capacitor 51 according to the present embodiment. The capacitor 51 includes a main body 2, a first terminal 3 and a second terminal 4, as in the first embodiment.

The main body 2 of the present embodiment has the same shape as the main body 2 of the first embodiment. Like the main body 2 of the first embodiment, the main body 2 of the present embodiment includes a first substrate 11, a second substrate 12, and a plurality of layer portions located between the first substrate 11 and the second substrate 12.

FIG. 23 illustrates an example in which the main body 2 includes six layer portions 10S1, 10S2, 10S3, 10S4, 10S5, and 10S6, which are listed in the order from bottom to top. The number of the layer portions is not limited to six, and may be at least one. As in the first embodiment, the reference numeral 10 will be used to represent any layer portion in the present embodiment.

The layer portion 10 of the present embodiment includes the dielectric structure 20, the first electrode 23, the second electrode 24 and the dielectric films 25 and 26 of the first embodiment, and further includes a first conductor layer 61 and a second conductor layer 62 each formed of a conductor, and a first dielectric layer 71, a second dielectric layer 72, a dielectric layer 73, and a dielectric layer 74 each formed of a dielectric. The conductor used to form each of the first and second conductor layers 61 and 62 may be the same as or different from the conductor used to form the first and second electrodes 23 and 24. The dielectric used to form each of the dielectric layers 71, 72, 73 and 74 may be the same as or different from the dielectric used to form the dielectric structure 20.

The first conductor layer 61 and the second conductor layer 62 are located at different positions in the first direction, i.e., the Z direction. The dielectric structure 20 and the first and second electrodes 23 and 24 are located between the first conductor layer 61 and the second conductor layer 62.

The locations of the conductor layers 61 and 62 and the dielectric layers 71, 72, 73 and 74 in the layer portion 10S1 will now be described. The second conductor layer 62 is located above the first conductor layer 61. The first conductor layer 61 is located on a part of the top surface of the dielectric film 25. The first conductor layer 61 is not present below the base portion 24a of the second electrode 24. The dielectric layer 73 is located on the remaining part of the top surface of the dielectric film 25.

The first dielectric layer 71 is interposed between the second electrode 24 and each of the first conductor layer 61 and the dielectric layer 73, and not interposed between the first electrode 23 and the first conductor layer 61.

The second dielectric layer 72 is interposed between the second electrode 24 and each of the second conductor layer 62 and the dielectric layer 74, and not interposed between the first electrode 23 and the second conductor layer 62.

The second conductor layer 62 covers the top surface of the first electrode 23 and a part of the top surface of the second dielectric layer 72. The second conductor layer 62 is not present above the base portion 24a of the second electrode 24. The dielectric layer 74 covers a part of the top surface of the second dielectric layer 72 that is not covered with the second conductor layer 62. The dielectric film 26 covers the second conductor layer 62 and the dielectric layer 74.

The first electrode 23 is connected to the first conductor layer 61 and the second conductor layer 62. The first dielectric layer 71 insulates the second electrode 24 from the first conductor layer 61. The second dielectric layer 72 insulates the second electrode 24 from the second conductor layer 62.

Each of the layer portions 10S3 and 10S5 has the same configuration as that of the layer portion 10S1. Each of the layer portions 10S2, 10S4 and 10S6 has the same configuration as that of the layer portion 10S1 except for being upside down from the layer portion 10S1.

A manufacturing method for the capacitor 51 according to the present embodiment will now be described. In the present embodiment, the layer-portion formation step is different from that in the first embodiment. The layer-portion formation step in the present embodiment will be described with reference to FIG. 24 to FIG. 29.

Figure 24:
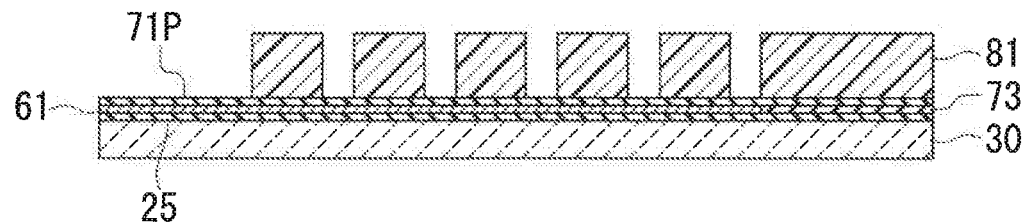
FIG. 24 is a cross-sectional view showing a step of a manufacturing method for the capacitor according to the third embodiment of the invention.

FIG. 24 is a cross-sectional view showing a step of the manufacturing method for the capacitor 51. In the layer-portion formation step in the present embodiment, first, the dielectric film 25 is formed on the substrate 30 as shown in FIG. 24. Then, the first conductor layer 61 is formed on the dielectric film 25. The dielectric layer 73 is then formed to cover the first conductor layer 61 and the dielectric film 25. The dielectric layer 73 is then polished by, for example, CMP, until the first conductor layer 61 becomes exposed.

Next, a dielectric film 71P, which will be patterned later into the first dielectric layer 71, is formed on the first conductor layer 61 and the dielectric layer 73. Then, a mask 81 for patterning the dielectric film 71P is formed on the dielectric film 71P. The mask 81 is formed by patterning a photoresist layer by photolithography, for example. Using the mask 81, the dielectric film 71P is then selectively etched by IBE, for example. This makes the dielectric film 71P into the first dielectric layer 71 shown in FIG. 25.

Figure 25:
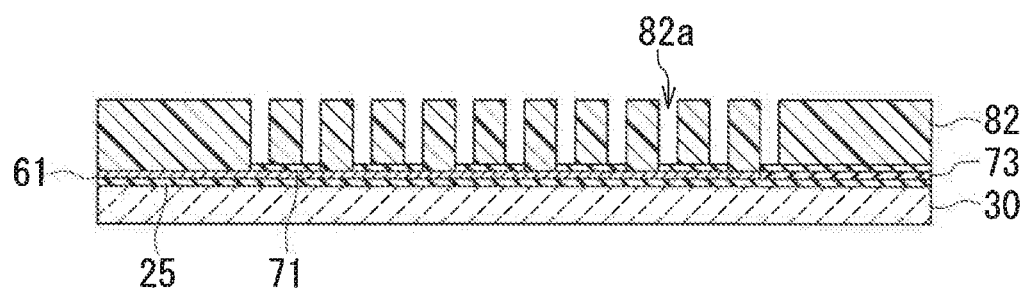
FIG. 25 is a cross-sectional view showing a step that follows the step of FIG. 24.

Next, as shown in FIG. 25, a mask 82 having an opening 82a shaped to correspond to the shape of the dielectric structure 20 to be formed later is formed on the first conductor layer 61 and the first dielectric layer 71. The mask 82 is formed by patterning a photoresist layer by photolithography, for example.

Figure 26:
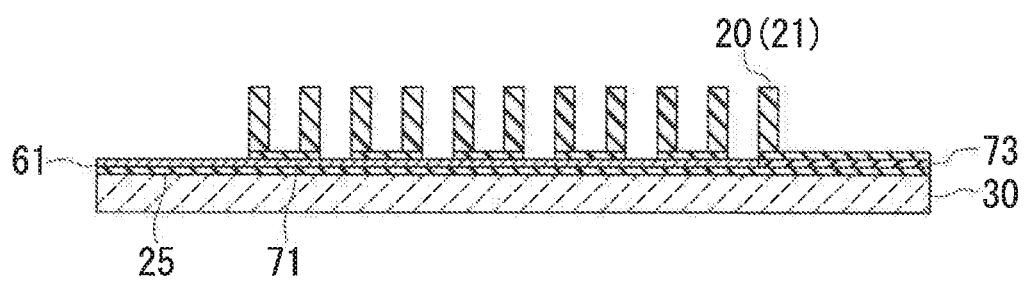
FIG. 26 is a cross-sectional view showing a step that follows the step of FIG. 25.

Next, as shown in FIG. 26, the dielectric structure 20 is formed in the same manner as the step of forming the dielectric structure 20 of the first embodiment described with reference to FIG. 7 to FIG. 9.

Figure 27:
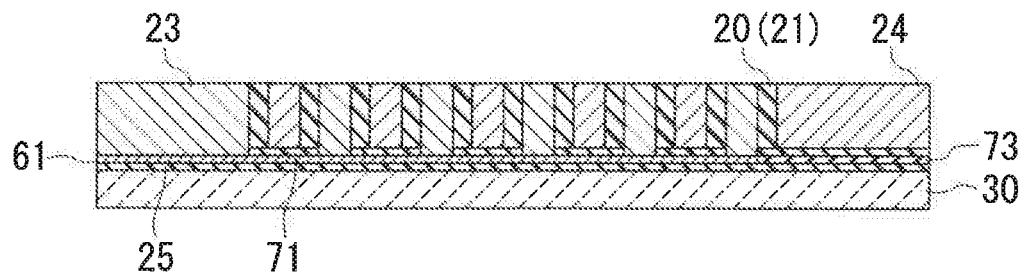
FIG. 27 is a cross-sectional view showing a step that follows the step of FIG. 26.

Next, as shown in FIG. 27, the first electrode 23 and the second electrode 24 are formed simultaneously in the same manner as the step of forming the first electrode 23 and the second electrode 24 of the first embodiment described with reference to FIG. 11 and FIG. 12.

Figure 28:
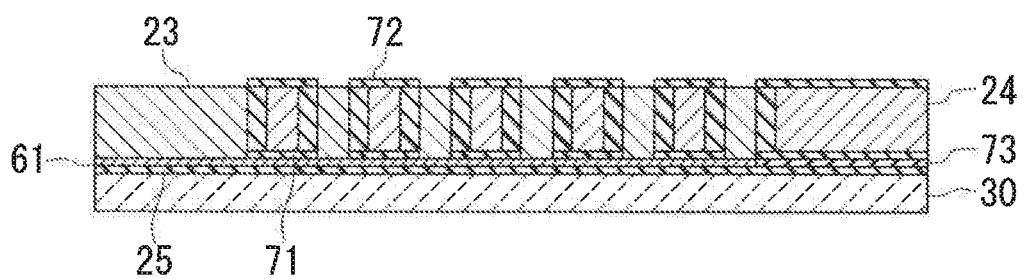
FIG. 28 is a cross-sectional view showing a step that follows the step of FIG. 27.
Figure 29:
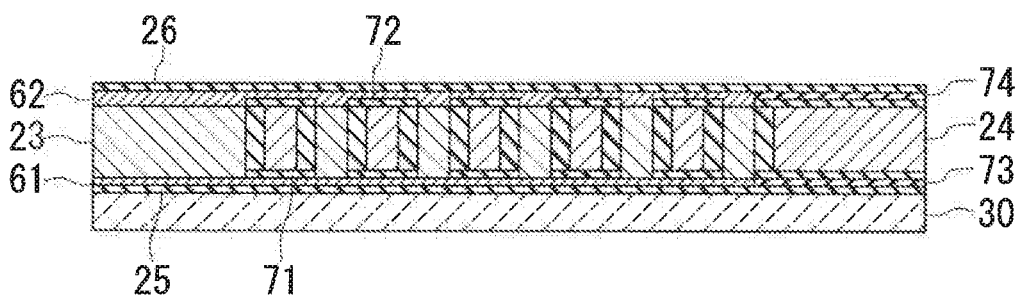
FIG. 29 is a cross-sectional view showing a step that follows the step of FIG. 28.

Next, as shown in FIG. 28, the second dielectric layer 72 is formed to cover the dielectric structure 20 and the second electrode 24. For example, the second dielectric layer 72 is formed by the same method as that used for the first dielectric layer 71. Next, as shown in FIG. 29, the second conductor layer 62 is formed to cover the top surface of the first electrode 23 and a part of the top surface of the second dielectric layer 72. Then, the dielectric layer 74 is formed to cover the second conductor layer 62 and the second dielectric layer 72. The dielectric layer 74 is then polished by, for example, CMP, until the second conductor layer 62 becomes exposed. Next, the dielectric film 26 is formed to cover the second conductor layer 62 and the dielectric layer 74. This produces a first substructure in which the layer portion 10 lies on the substrate 30.

In the present embodiment, the step of forming the main body 2 by stacking a plurality of layer portions 10 is the same as in the first embodiment.

In the present embodiment, a side surface of the second electrode 24 faces a side surface of the first electrode 23 with the wall 21 therebetween. Part of the capacitance between the first electrode 23 and the second electrode 24 is thereby formed.

In the present embodiment, the first electrode 23 is connected to the first conductor layer 61 and the second conductor layer 62. The bottom surfaces of the plurality of trunk portions 24b and the plurality of sets of branch portions 24c of the second electrode 24 face the first conductor layer 61 with the first dielectric layer 71 therebetween. Another part of the capacitance between the first electrode 23 and the second electrode 24 is thereby formed.

The top surfaces of the plurality of trunk portions 24b and the plurality of sets of branch portions 24c of the second electrode 24 face the second conductor layer 62 with the second dielectric layer 72 therebetween. Still another part of the capacitance between the first electrode 23 and the second electrode 24 is thereby formed.

By virtue of the foregoing, the capacitor 51 according to the present embodiment provides a greater capacitance than that of the capacitor 1 according to the first embodiment.

The remainder of configuration, function and effects of the present embodiment are similar to those of the first embodiment.

Fourth Embodiment

Figure 30:
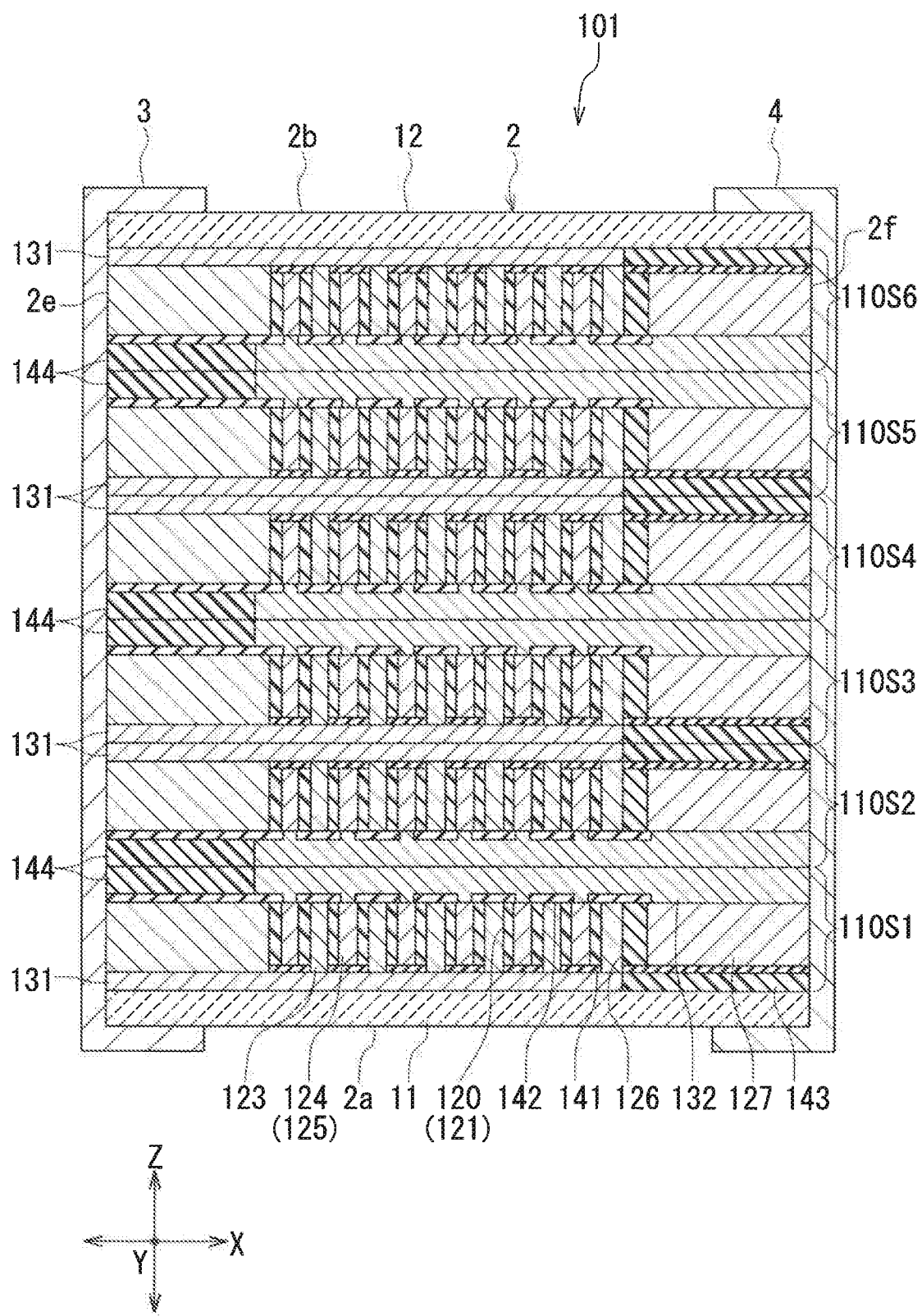
FIG. 30 is a cross-sectional view of a capacitor according to a fourth embodiment of the invention.

A fourth embodiment of the invention will now be described. First, reference is made to FIG. 30 to describe the configuration of a capacitor 101 according to the present embodiment. FIG. 30 is a cross-sectional view of the capacitor 101 according to the present embodiment. The capacitor 101 includes a main body 2, a first terminal 3 and a second terminal 4, as in the first embodiment.

The main body 2 of the present embodiment has the same shape as the main body 2 of the first embodiment. Like the main body 2 of the first embodiment, the main body 2 of the present embodiment includes a first substrate 11, a second substrate 12, and a plurality of layer portions located between the first substrate 11 and the second substrate 12.

The plurality of layer portions are stacked in the first direction, i.e., the Z direction. FIG. 30 illustrates an example in which the main body 2 includes six layer portions. The number of the layer portions is not limited to six, and may be at least one. The six layer portions shown in FIG. 30 are denoted by reference symbols 110S1, 110S2, 110S3, 110S4, 110S5, and 110S6 in the order from bottom to top. Reference numeral 110 will be used to represent any layer portion.

The layer portion 110 includes a dielectric structure 120, a first electrode 123, and a second electrode 124. The dielectric structure 120 is formed of a sintered dielectric. Each of the first and second electrodes 123 and 124 is formed of a conductor.

The dielectric structure 120 includes at least one continuous wall. The at least one continuous wall has a non-straight shape when seen in the first direction, i.e., the Z direction. In the present embodiment, the at least one continuous wall is a plurality of walls 121 formed to define a plurality of cavities. The first electrode 123 and the second electrode 124 are insulated from each other by the plurality of walls 121.

Each of the plurality of walls 121 has a height, which is a dimension in the first direction, i.e., the Z direction, and a thickness, which is a dimension in the second direction orthogonal to the first direction. The height is greater than the thickness.

The first electrode 123 is disposed around the plurality of walls 121. The first electrode 123 has a side surface constituting part of the side surface 2e of the main body 2. The second electrode 124 includes a plurality of pillar portions 125 disposed in the plurality of cavities. Each of the plurality of pillar portions 125 has two end faces located at opposite ends in the first direction, i.e., the Z direction, and a peripheral surface connecting the two end faces. Each of the plurality of pillar portions 125 may have a prismatic shape or a cylindrical shape. Specific examples of the shape of the plurality of walls 121 will be described later.

The layer portion 110 further includes a dielectric portion 126 formed of a sintered dielectric, and a conductor portion 127, a first conductor layer 131 and a second conductor layer 132 each formed of a conductor. The layer portion 110 further includes a first dielectric layer 141, a second dielectric layer 142, a dielectric layer 143 and a dielectric layer 144 each formed of a dielectric.

The dielectric used to form the dielectric portion 126 is the same as that used to form the dielectric structure 120. The conductor used to form the conductor portion 127 is the same as the conductor used to form the first and second electrodes 123 and 124. The conductor(s) used to form the first and second conductor layers 131 and 132 may be the same as or different from the conductor used to form the first and second electrodes 123 and 124. The dielectric(s) used to form the dielectric layers 141, 142, 143 and 144 may be the same as or different from the dielectric used to form the dielectric structure 120.

The conductor portion 127 is in contact with and electrically connected to the second conductor layer 132. The conductor portion 127 has a side surface constituting part of the side surface 2f of the main body 2.

The first conductor layer 131 and the second conductor layer 132 are located at different positions in the first direction, i.e., the Z direction. The dielectric structure 120 and the first and second electrodes 123 and 124 are located between the first conductor layer 131 and the second conductor layer 132.

The first conductor layer 131 has a side surface constituting part of the side surface 2e of the main body 2. The first conductor layer 131 is not exposed in the side surface 2f of the main body 2. The second conductor layer 132 has a side surface constituting part of the side surface 2f of the main body 2. The second conductor layer 132 is not exposed in the side surface 2e of the main body 2.

In the layer portions 110S1, 110S3 and 110S5, the second conductor layer 132 is located above the first conductor layer 131, whereas in the layer portions 110S2, 110S4 and 110S6, the first conductor layer 131 is located above the second conductor layer 132. This difference results from the manufacturing method for the capacitor 101 to be described later.

The first electrode 123 is connected to the first conductor layer 131. The second electrode 124 is connected to the second conductor layer 132. The first dielectric layer 141 insulates the second electrode 124 from the first conductor layer 131. The second dielectric layer 142 insulates the first electrode 123 from the second conductor layer 132.

The locations of the conductor layers 131 and 132 and the dielectric layers 141, 142, 143 and 144, the dielectric portion 126 and the conductor portion 127 in the layer portion 110S1 will now be described. The first conductor layer 131 is located on a part of the top surface of the first substrate 11. The first conductor layer 131 is not present below the conductor portion 127. The dielectric layer 143 is located on the remaining part of the top surface of the first substrate 11.

The first dielectric layer 141 is interposed between the first conductor layer 131 and the second electrode 124, and between the dielectric layer 143 and the conductor portion 127, and not interposed between the first conductor layer 131 and the first electrode 123. The dielectric portion 126 insulates the conductor portion 127 from the first electrode 123.

The second dielectric layer 142 covers the top surface of the first electrode 123. The second conductor layer 132 covers the top surface of the second electrode 124 and a part of the top surface of the second dielectric layer 142. The dielectric layer 144 covers a part of the top surface of the second dielectric layer 142 that is not covered with the second conductor layer 132.

The second dielectric layer 142 is interposed between the second conductor layer 132 and the first electrode 123, and not interposed between the second conductor layer 132 and the second electrode 124.

Each of the layer portions 110S3 and 110S5 has the same configuration as that of the layer portion 110S1. Each of the layer portions 110S2, 110S4 and 110S6 has the same configuration as that of the layer portion 110S1 except for being upside down from the layer portion 110S1.

As shown in FIG. 30, the first terminal 3 is in contact with the side surface of the first conductor layer 131 and the side surface of the first electrode 123 of each of the layer portions 110S1, 110S2, 110S3, 110S4, 110S5 and 110S6. The first electrodes 123 of the layer portions 110S1, 110S2, 110S3, 110S4, 110S5 and 110S6 and the first terminal 3 are thereby electrically connected to each other.

The second terminal 4 is in contact with the side surface of the second conductor layer 132 and the side surface of the conductor portion 127 of each of the layer portions 110S1, 110S2, 110S3, 110S4, 110S5 and 110S6. The second electrodes 124 of the layer portions 110S1, 110S2, 110S3, 110S4, 110S5 and 110S6 and the second terminal 4 are thereby electrically connected to each other.

A first to a fourth example of the plurality of walls 121 will now be described with reference to FIG. 31 to FIG. 39. In FIGS. 32, 35, 37 and 39, the height and the thickness of the walls 121 are denoted by reference symbols h and t, respectively.

Figure 31:
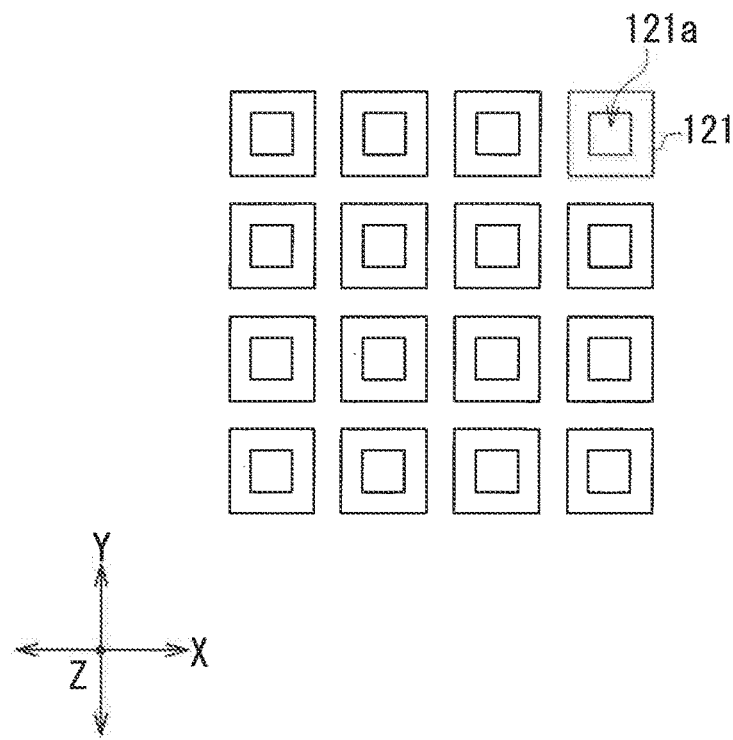
FIG. 31 is a plan view showing a plurality of walls of a first example of the fourth embodiment of the invention.
Figure 32:
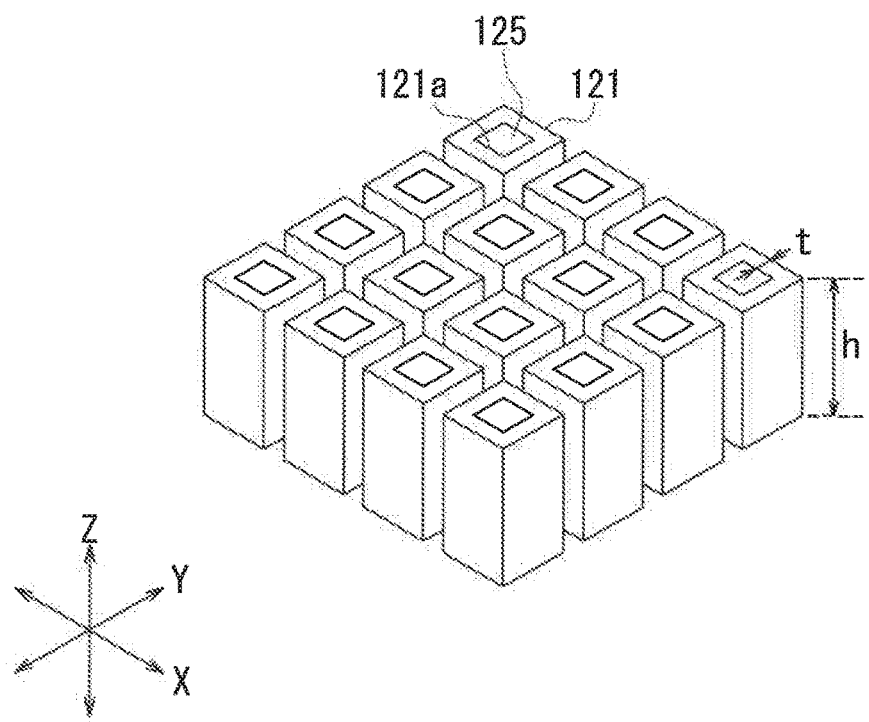
FIG. 32 is a perspective view showing the plurality of walls and a plurality of pillar portions of the first example of the fourth embodiment of the invention.
Figure 33:
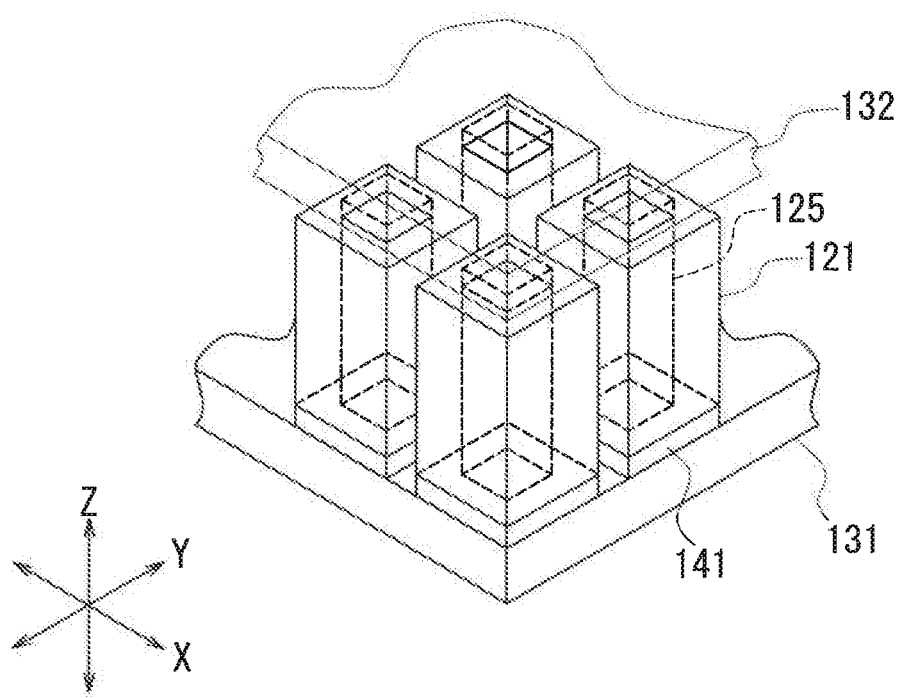
FIG. 33 is a perspective view showing the plurality of walls and their surroundings of the first example of the fourth embodiment of the invention.

FIG. 31 to FIG. 33 illustrate the first example. FIG. 31 is a plan view showing the walls 121 of the first example. FIG. 32 is a perspective view showing the walls 121 and the pillar portions 125 of the first example. FIG. 33 is a perspective view showing the walls 121 and their surroundings of the first example. In FIG. 33 the first electrode 123 and the second dielectric layer 142 are omitted.

In the first example, as shown in FIG. 31 and FIG. 32, each of the walls 121 is formed to define a cavity 121a in the shape of a quadrangular prism. In a cross section perpendicular to the Z direction, both of the outer and inner perimeters of each wall 121 are square, and the centers of gravity of the two squares coincide with each other. Each wall 121 has a uniform thickness in a direction perpendicular to each of the four side surfaces. The walls 121 are aligned in rows such that each of the four side surfaces of each of the walls 121, except ones located at opposite ends of each row, faces a side surface of one of four other walls 121 with a predetermined spacing therebetween.

As shown in FIG. 32 and FIG. 33, the pillar portions 125 are disposed in the cavities 121a of the walls 121. The pillar portions 125 are each in the shape of a quadrangular prism. Each pillar portion 125 is square in cross section perpendicular to the Z direction.

Figure 34:
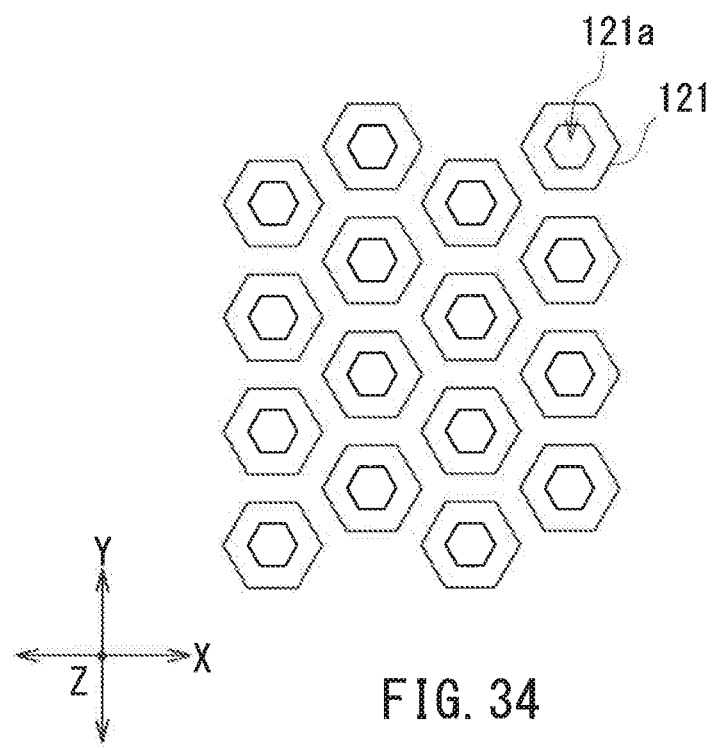
FIG. 34 is a plan view showing a plurality of walls of a second example of the fourth embodiment of the invention.
Figure 35:
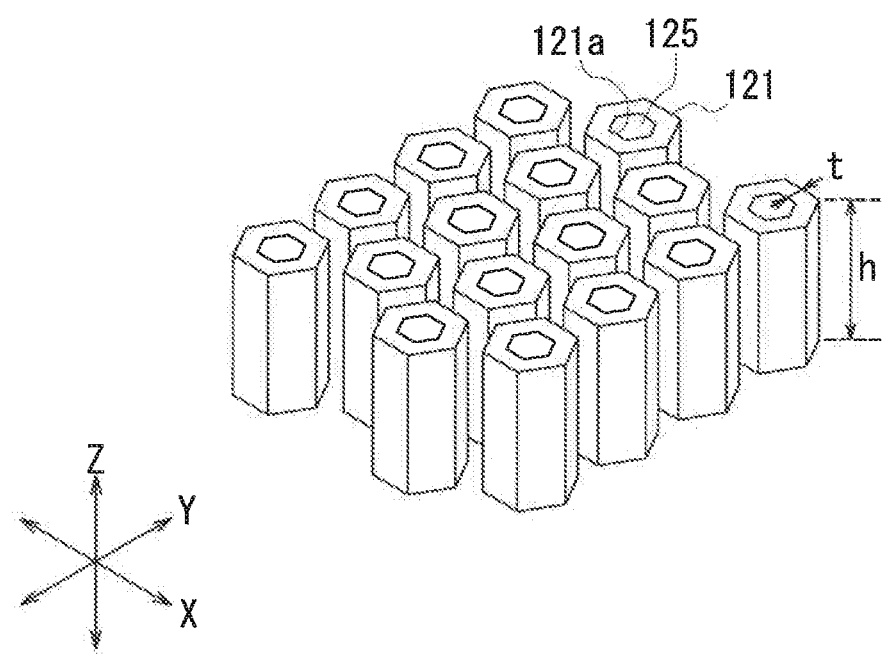
FIG. 35 is a perspective view showing the plurality of walls and a plurality of pillar portions of the second example of the fourth embodiment of the invention.

FIG. 34 and FIG. 35 illustrate the second example. FIG. 34 is a plan view showing the walls 121 of the second example. FIG. 35 is a perspective view showing the walls 121 and the pillar portions 125 of the second example.

In the second example, each of the walls 121 is formed to define a cavity 121a in the shape of a hexagonal prism. In a cross section perpendicular to the Z direction, both of the outer and inner perimeters of each wall 121 are regular hexagonal, and the centers of gravity of the two regular hexagons coincide with each other. Each wall 121 has a uniform thickness in a direction perpendicular to each of the six side surfaces. The walls 121 are aligned in rows such that each of the six side surfaces of each of the walls 121, except ones located at opposite ends of each row, faces a side surface of one of six other walls 121 with a predetermined spacing therebetween. The pillar portions 125 are each in the shape of a hexagonal prism. Each pillar portion 125 is regular hexagonal in cross section perpendicular to the Z direction.

Figure 36:
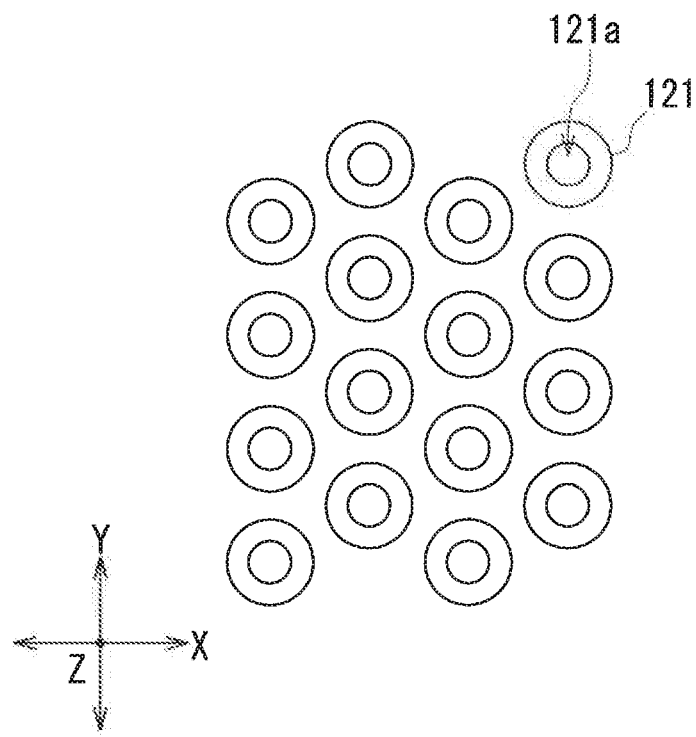
FIG. 36 is a plan view showing a plurality of walls of a third example of the fourth embodiment of the invention.
Figure 37:
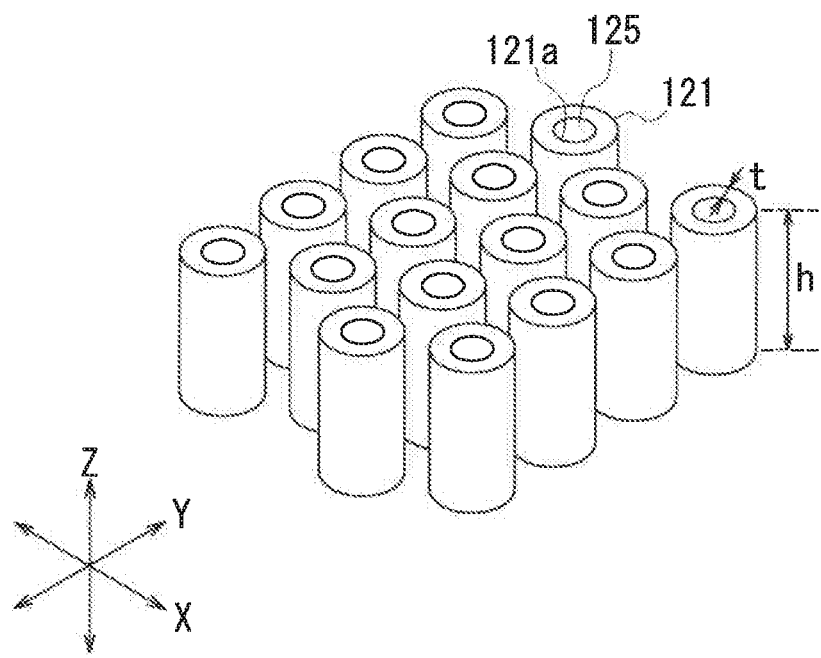
FIG. 37 is a perspective view showing the plurality of walls and a plurality of pillar portions of the third example of the fourth embodiment of the invention.

FIG. 36 and FIG. 37 illustrate the third example. FIG. 36 is a plan view showing the walls 121 of the third example. FIG. 37 is a perspective view showing the walls 121 and the pillar portions 125 of the third example.

In the third example, each of the walls 121 is formed to define a cavity 121a of a cylindrical shape. In a cross section perpendicular to the Z direction, both of the outer and inner perimeters of each wall 121 are circular, and the centers of the two circles coincide with each other. Each wall 121 has a uniform thickness in a direction perpendicular to the periphery thereof. The walls 121 are aligned in rows such that each of the walls 121, except ones located at opposite ends of each row, is surrounded by six other walls 121 with a constant spacing between adjacent walls 121. Each of the pillar portions 125 has a cylindrical shape.

Figure 38:
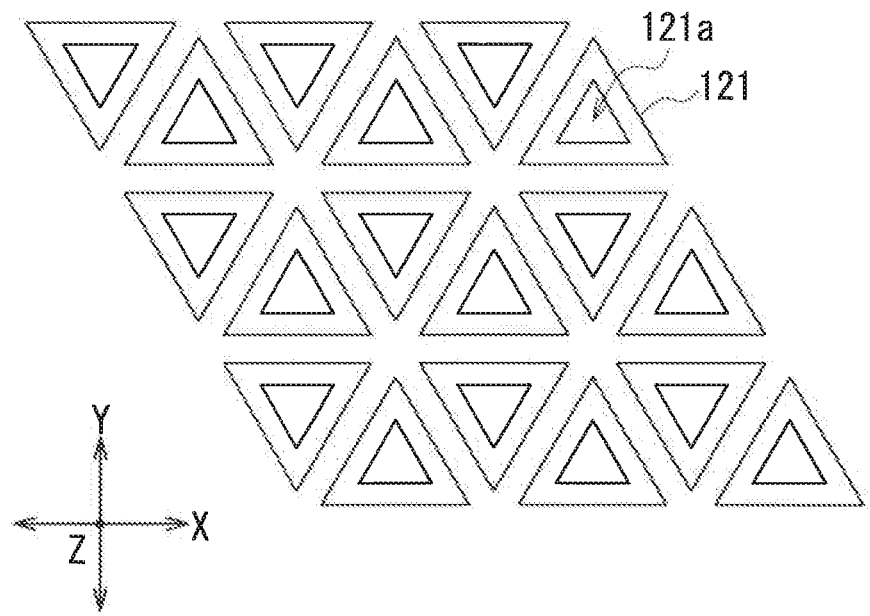
FIG. 38 is a plan view showing a plurality of walls of a fourth example of the fourth embodiment of the invention.
Figure 39:
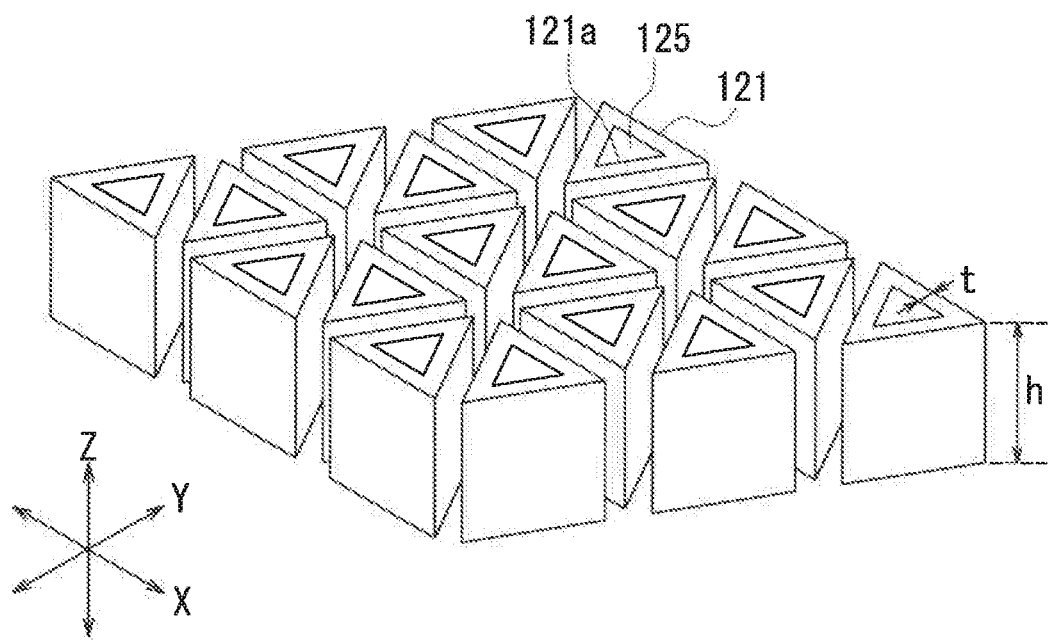
FIG. 39 is a perspective view showing the plurality of walls and a plurality of pillar portions of the fourth example of the fourth embodiment of the invention.

FIG. 38 and FIG. 39 illustrate the fourth example. FIG. 38 is a plan view showing the walls 121 of the fourth example. FIG. 39 is a perspective view showing the walls 121 and the pillar portions 125 of the fourth example.

In the fourth example, each of the walls 121 is formed to define a cavity 121a in the shape of a triangular prism. In a cross section perpendicular to the Z direction, both of the outer and inner perimeters of each wall 121 are equilateral triangular, and the centers of gravity of the two equilateral triangles coincide with each other. Each wall 121 has a uniform thickness in a direction perpendicular to each of the three side surfaces. The walls 121 are aligned in rows such that each of the three side surfaces of each of the walls 121, except ones located at opposite ends of each row, faces a side surface of one of three other walls 121 with a predetermined spacing therebetween. The pillar portions 125 are each in the shape of a triangular prism. Each pillar portion 125 is equilateral triangular in cross section perpendicular to the Z direction.

A manufacturing method for the capacitor 101 according to the present embodiment will now be described. In the present embodiment, the layer-portion formation step is different from that in the first embodiment. The layer-portion formation step in the present embodiment will be described with reference to FIG. 40 to FIG. 48.

Figure 40:
FIG. 40 is a cross-sectional view showing a step of a manufacturing method for the capacitor according to the fourth embodiment of the invention.

FIG. 40 is a cross-sectional view showing a step of the manufacturing method for the capacitor 101. In the layer-portion formation step in the present embodiment, first, the first conductor layer 131 is formed on the substrate 30 as shown in FIG. 40. Then, the dielectric layer 143 is formed to cover the first conductor layer 131 and the substrate 30. The dielectric layer 143 is then polished by, for example, CMP, until the first conductor layer 131 becomes exposed.

Figure 41:
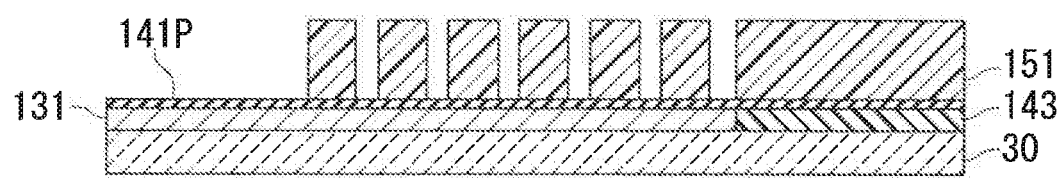
FIG. 41 is a cross-sectional view showing a step that follows the step of FIG. 40.

Next, as shown in FIG. 41, a dielectric film 141P, which will be patterned later into the first dielectric layer 141, is formed on the first conductor layer 131 and the dielectric layer 143. Then, a mask 151 for patterning the dielectric film 141P is formed on the dielectric film 141P. The mask 151 is formed by patterning a photoresist layer by photolithography, for example. Using the mask 151, the dielectric film 141P is then selectively etched by IBE, for example. This makes the dielectric film 141P into the first dielectric layer 141 shown in FIG. 42.

Figure 42:
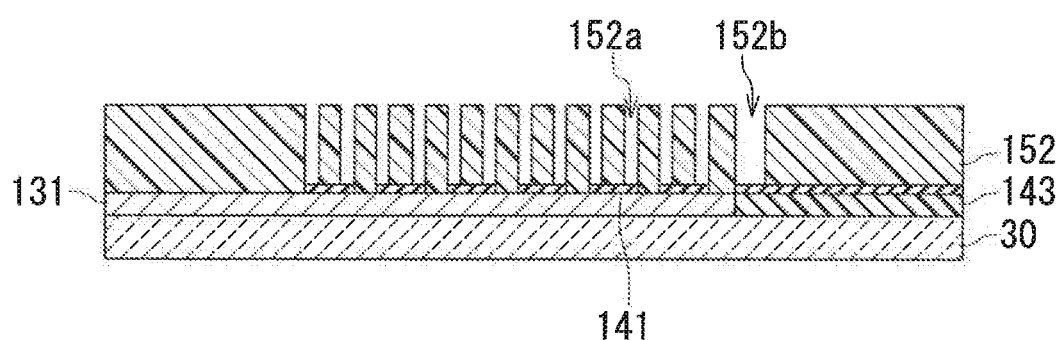
FIG. 42 is a cross-sectional view showing a step that follows the step of FIG. 41.

Next, as shown in FIG. 42, a mask 152, which has openings 152*a* and 152*b* shaped to correspond to the shapes of the dielectric structure 120 and the dielectric portion 126 to be formed later, is formed on the first conductor layer 131 and the first dielectric layer 141. The mask 152 is formed by patterning a photoresist layer by photolithography, for example.

Figure 43:
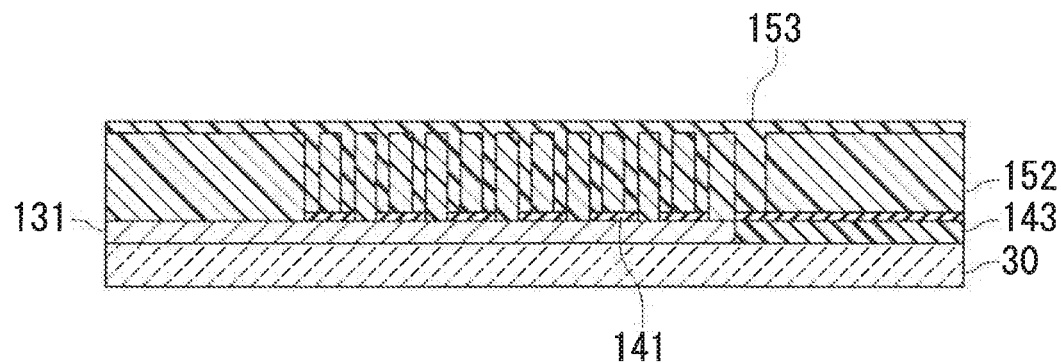
FIG. 43 is a cross-sectional view showing a step that follows the step of FIG. 42.

Next, as shown in FIG. 43, the material of the dielectric structure 120 is loaded into the openings 152*a* and 152*b* of the mask 152 in the same manner as the step described with reference to FIG. 7 in relation to the first embodiment. As in the first embodiment, an example of the material of the dielectric structure 120 is slurry 153 containing ultra-fine particles of a dielectric such as BaTiO$_3$. For example, spray coating is employed to load the slurry 153 into the openings 152*a* and 152*b* of the mask 152.

FIG. 43 illustrates a state in which the mask 152 has been coated with the slurry 153 by spray coating. When in this state, the applied slurry 153 includes portions filling the openings 152*a* and 152*b* of the mask 152 and portions extending out of the openings 152*a* and 152*b*.

Next, as in the first embodiment, the slurry 153 shown in FIG. 43 is heat-treated at temperatures within the range of, e.g., 100° C. to 200° C., to form an initial structure. The initial structure includes portions filling the openings 152*a* and 152*b* of the mask 152 and portions extending out of the openings 152*a* and 152*b*.

Next, the portions of the initial structure extending out of the opening 152*a* and 152*b* of the mask 152 are removed in the same manner as the step described with reference to FIG. 8 in relation to the first embodiment. As a result, only the portions of the initial structure present in the openings 152*a* and 152*b* of the mask 152 remain to constitute an unfired structure.

Figure 44:
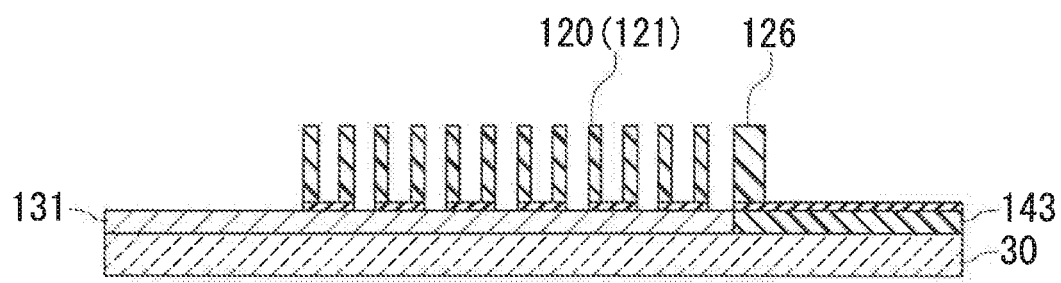
FIG. 44 is a cross-sectional view showing a step that follows the step of FIG. 43.

Next, the mask 152 is removed and the unfired structure is fired in the same manner as the step described with reference to FIG. 9 in relation to the first embodiment. As a result, as shown in FIG. 44, the portion of the unfired structure present in the opening 152*a* of the mask 152 becomes the dielectric structure 120, and the portion of the unfired structure present in the opening 152*b* of the mask 152 becomes the dielectric portion 126.

Figure 45:
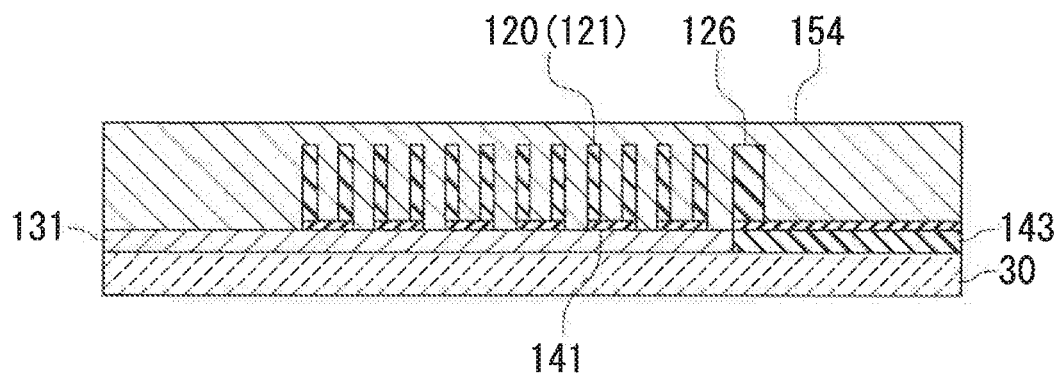
FIG. 45 is a cross-sectional view showing a step that follows the step of FIG. 44.
Figure 46:
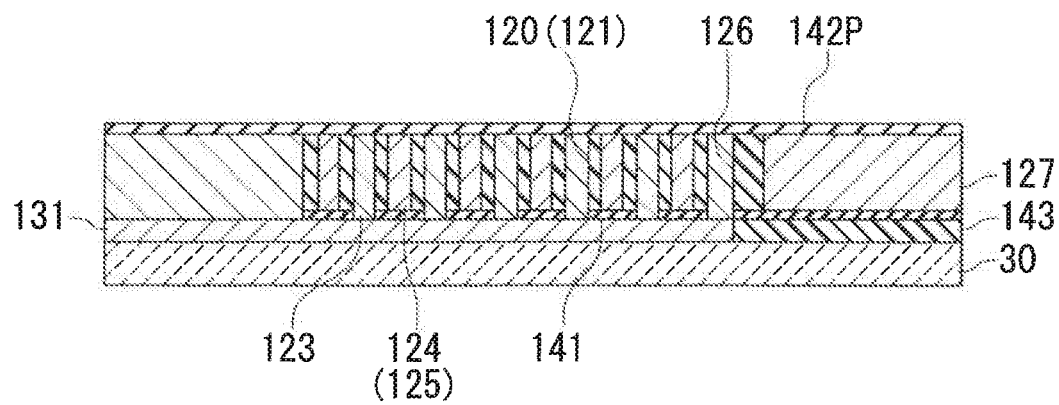
FIG. 46 is a cross-sectional view showing a step that follows the step of FIG. 45.

Next, as shown in FIG. 45, a conductor film 154 of a conductor is formed to cover the dielectric structure 120 and the dielectric portion 126 by plating, for example. The conductor film 154 is then polished by, for example, CMP, until the dielectric structure 120 and the dielectric portion 126 become exposed. This divides the conductor film 154 into the first electrode 123, the second electrode 124, and the conductor portion 127, as shown in FIG. 46. In this way, the first electrode 123 and the second electrode 124 are formed simultaneously.

The first electrode 123 and the second electrode 124 are insulated from each other by the walls 121 of the dielectric structure 120. The conductor portion 127 is insulated from the first electrode 123 by the dielectric portion 126.

Next, as shown in FIG. 46, a dielectric film 142P, which will be patterned later into the second dielectric layer 142, is formed to cover the dielectric structure 120, the dielectric portion 126, the first electrode 123, the second electrode 124 and the conductor portion 127.

Figure 47:
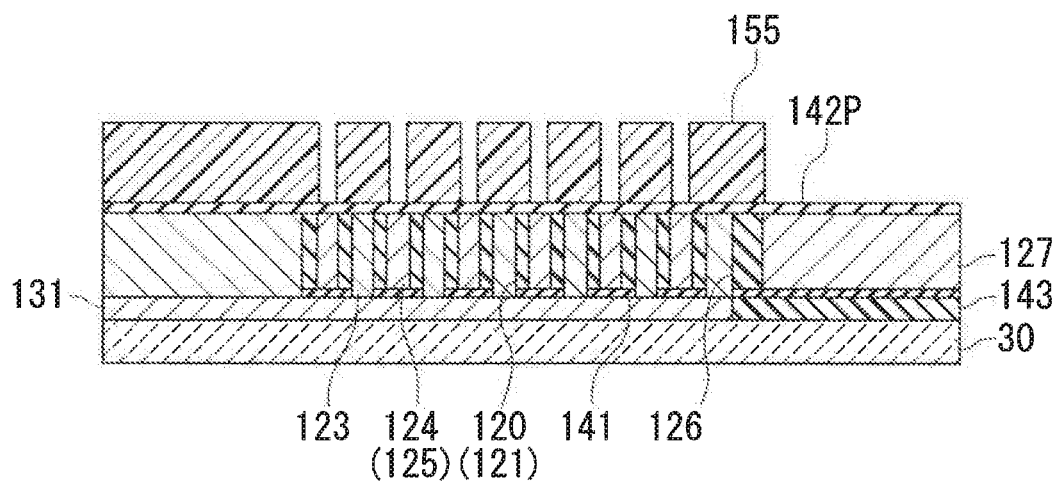
FIG. 47 is a cross-sectional view showing a step that follows the step of FIG. 46.

Next, as shown in FIG. 47, a mask 155 for patterning the dielectric film 142P is formed on the dielectric film 142P. The mask 155 is formed by patterning a photoresist layer by photolithography, for example. Using the mask 155, the dielectric film 142P is then selectively etched by IBE, for example. This makes the dielectric film 142P into the second dielectric layer 142 shown in FIG. 48.

Figure 48:
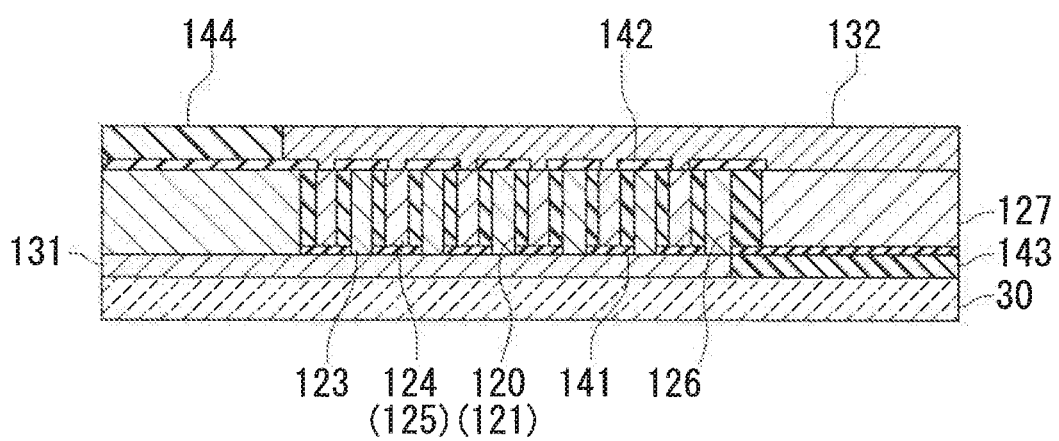
FIG. 48 is a cross-sectional view showing a step that follows the step of FIG. 47.

Next, as shown in FIG. 48, the second conductor layer 132 is formed to cover the top surface of the second electrode 124 and a part of the top surface of the second dielectric layer 142. Then, the dielectric layer 144 is formed to cover the second conductor layer 132 and the second dielectric layer 142. The dielectric layer 144 is then polished by, for example, CMP, until the second conductor layer 132 becomes exposed. This produces a first substructure in which the layer portion 110 lies on the substrate 30.

In the manufacturing method for the capacitor 101 according to the present embodiment, a plurality of layer portions 110 are stacked to form the main body 2 in the same manner as the step described with reference to FIG. 15 to FIG. 17 in relation to the first embodiment. Then, the first terminal 3 and the second terminal 4 are formed on the main body 2 to complete the capacitor 101 shown in FIG. 30.

In the present embodiment, the peripheral surface of each of the pillar portions 125 of the second electrode 124 faces the first electrode 123 with a wall 121 therebetween. Part of the capacitance between the first electrode 123 and the second electrode 124 is thereby formed.

In the present embodiment, the first electrode 123 is electrically connected to the first conductor layer 131. One of the end faces of each of the pillar portions 125 of the second electrode 124 faces the first conductor layer 131 with the first dielectric layer 141 therebetween. Another part of the capacitance between the first electrode 123 and the second electrode 124 is thereby formed.

By virtue of the foregoing, the capacitor 101 according to the present embodiment provides a greater capacitance than that of the capacitor 1 according to the first embodiment.

The remainder of configuration, function and effects of the present embodiment are similar to those of the first embodiment.

Fifth Embodiment

Figure 49:
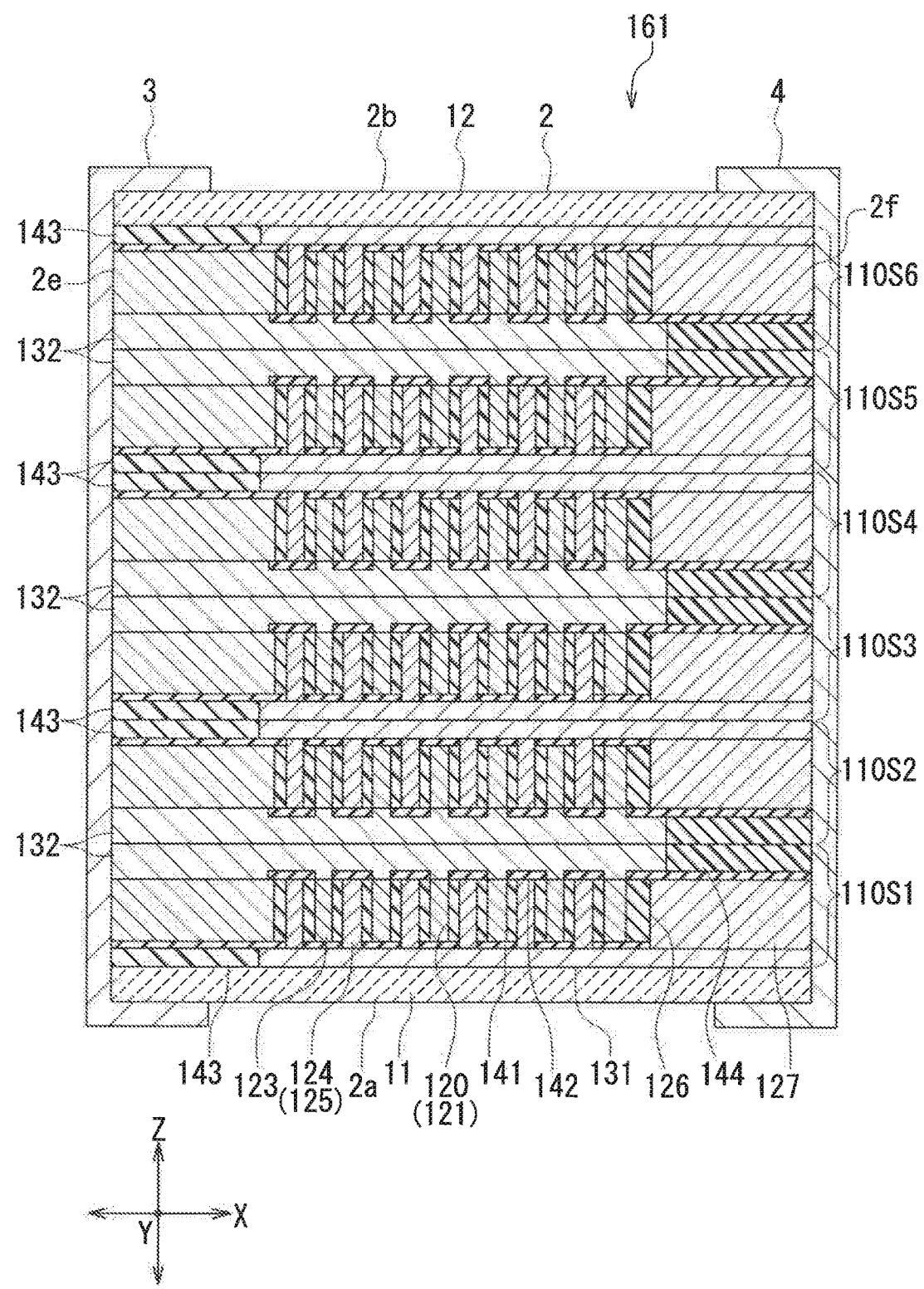
FIG. 49 is a cross-sectional view of a capacitor according to a fifth embodiment of the invention.

A fifth embodiment of the invention will now be described. FIG. 49 is a cross-sectional view of a capacitor 161 according to the present embodiment. In the capacitor 161 according to the present embodiment, the layer portions 110 are configured differently than in the fourth embodiment.

Like the fourth embodiment, the layer portions 110 of the present embodiment each include the dielectric structure 120, the first electrode 123, the second electrode 124, the dielectric portion 126, the conductor portion 127, the first conductor layer 131, the second conductor layer 132, the first dielectric layer 141, the second dielectric layer 142, the dielectric layer 143 and the dielectric layer 144.

The layer portion 110S1 of the present embodiment differs from the layer portion 110S1 of the fourth embodiment in the following ways.

The first conductor layer 131 lies on a part of the top surface of the first substrate 11. The first conductor layer 131 is not exposed in the side surface 2e of the main body 2. The conductor portion 127 is in contact with and electrically connected to the first conductor layer 131. Each of the conductor portion 127 and the first conductor layer 131 has a side surface constituting part of the side surface 2f of the main body 2. The dielectric layer 143 lies on the remaining part of the top surface of the first substrate 11.

The first dielectric layer 141 is interposed between the first conductor layer 131 and the first electrode 123, and not interposed between the first conductor layer 131 and the second electrode 124. The dielectric portion 126 insulates the conductor portion 127 from the first electrode 123.

The second dielectric layer 142 covers the top surface of the second electrode 124. The second conductor layer 132 covers the top surface of the first electrode 123 and a part of the top surface of the second dielectric layer 142. The second conductor layer 132 is not exposed in the side surface 2f of the main body 2. The dielectric layer 144 covers a part of the top surface of the second dielectric layer 142 that is not covered with the second conductor layer 132.

The second dielectric layer 142 is interposed between the second conductor layer 132 and the second electrode 124, and between the dielectric layer 144 and the conductor portion 127, and not interposed between the second conductor layer 132 and the first electrode 123. Each of the first electrode 123 and the second conductor layer 132 has a side surface constituting part of the side surface 2e of the main body 2.

Each of the layer portions 110S3 and 110S5 has the same configuration as that of the layer portion 110S1. Each of the layer portions 110S2, 110S4 and 110S6 has the same configuration as that of the layer portion 110S1 except for being upside down from the layer portion 110S1.

As shown in FIG. 49, the first terminal 3 is in contact with the side surface of the second conductor layer 132 and the side surface of the first electrode 123 of each of the layer portions 110S1, 110S2, 110S3, 110S4, 110S5 and 110S6. The first electrodes 123 of the layer portions 110S1, 110S2, 110S3, 110S4, 110S5 and 110S6 and the first terminal 3 are thereby electrically connected to each other.

The second terminal 4 is in contact with the side surface of the first conductor layer 131 and the side surface of the conductor portion 127 of each of the layer portions 110S1, 110S2, 110S3, 110S4, 110S5 and 110S6. The second electrodes 124 of the layer portions 110S1, 110S2, 110S3, 110S4, 110S5 and 110S6 and the second terminal 4 are thereby electrically connected to each other.

The manufacturing method for the capacitor 161 according to the present embodiment is the same as that for the capacitor 101 according to the fourth embodiment.

The remainder of configuration, function and effects of the present embodiment are the same as those of the fourth embodiment.

[Simulation]

Now, a description will be given of simulation results comparing effective areas of first to fourth models of capacitors. The effective area has a correspondence with capacitance. When two conductor portions have their respective surfaces facing each other to form a capacitance, the effective area refers to the area of the surface of one of the two conductor portions.

Figure 50:
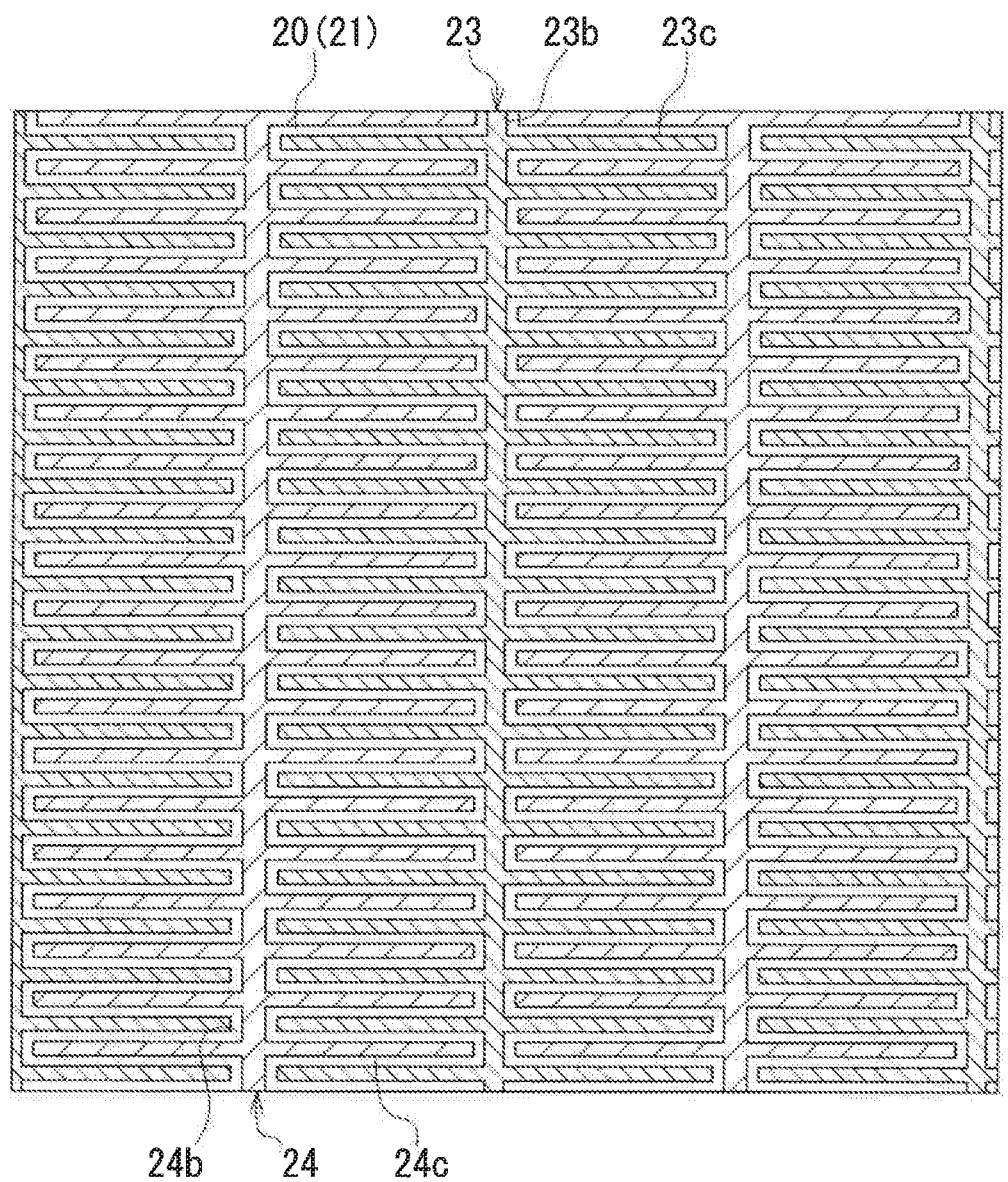
FIG. 50 is a plan view showing a first model used in a simulation.

FIG. 50 is a plan view showing the first model. The first model is a model of one layer portion 10 of the capacitor 51 according to the third embodiment shown in FIG. 23.

Figure 51:
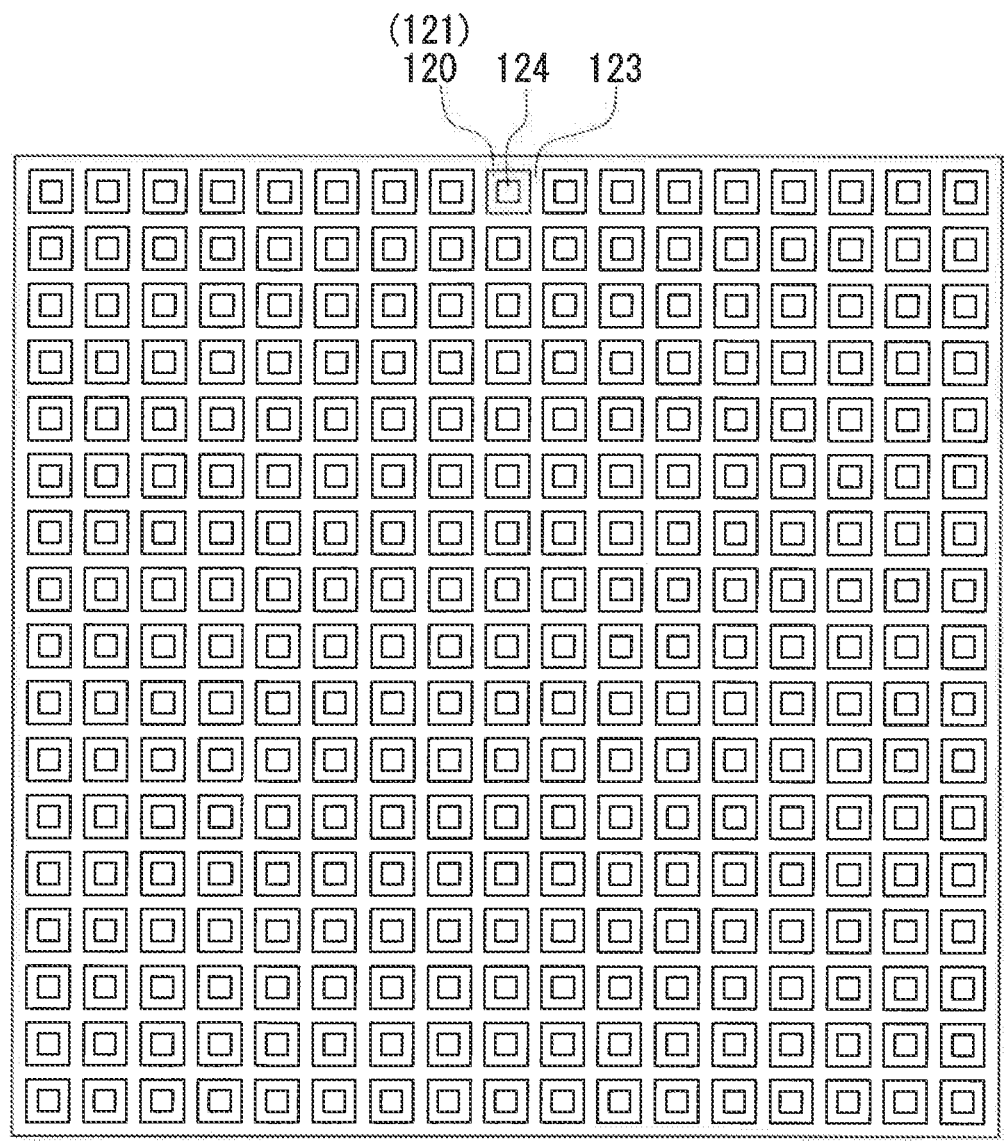
FIG. 51 is a plan view showing a second model used in the simulation.
Figure 52:
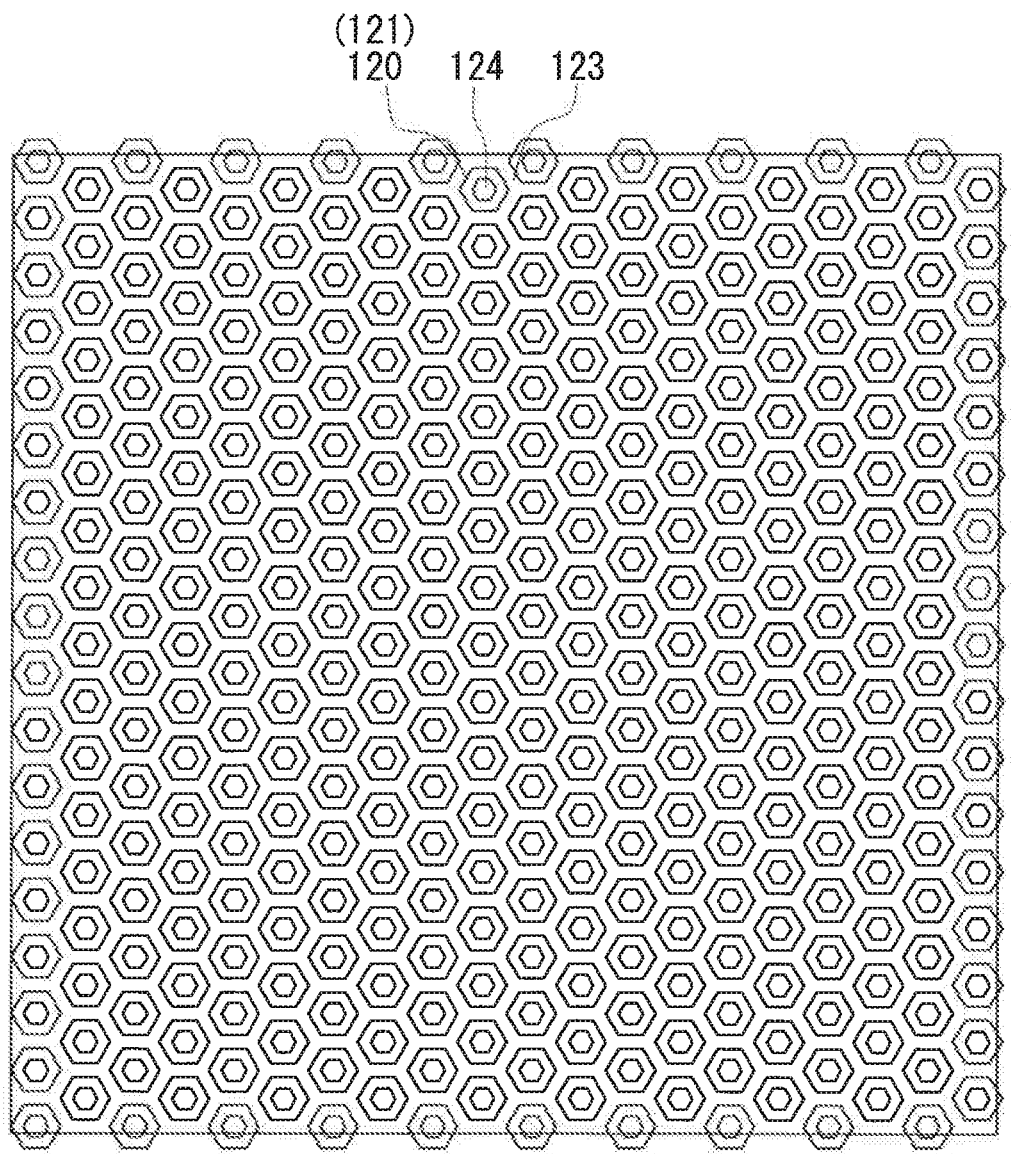
FIG. 52 is a plan view showing a third model used in the simulation.

FIG. 51 is a plan view showing the second model. The second model is a model of one layer portion 110 of the capacitor 101 according to the fourth embodiment shown in FIG. 30, in which the walls 121 are of the first example shown in FIG. 31 and FIG. 32. FIG. 52 is a plan view showing the third model. The third model is a model of one layer portion 110 of the capacitor 101 according to the fourth embodiment shown in FIG. 30, in which the walls 121 are of the second example shown in FIG. 34 and FIG. 35.

In the first to third models, the walls are 4 μm in height. Further, in the first to third models, the dielectric structure and the first and second electrodes are located in a square region with a side length of 48 μm when seen in the X direction.

Figure 53:
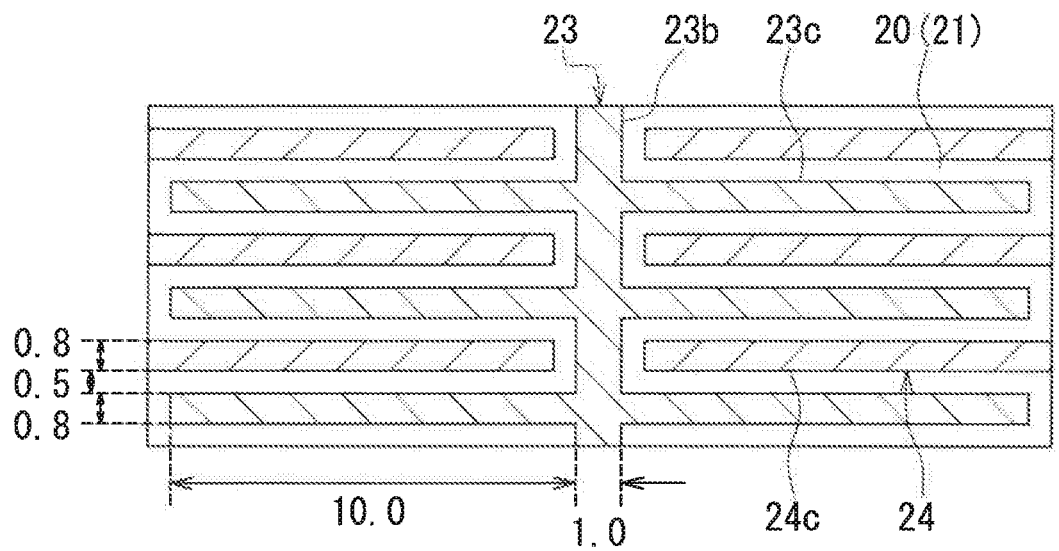
FIG. 53 is an explanatory diagram for explanations of the first model used in the simulation.

FIG. 53 is an explanatory diagram illustrating the shapes and layout of the dielectric structure 20 and the first and second electrodes 23 and 24 of the first model. FIG. 53 shows the dimensions of a plurality of portions defining the shapes and layout of the dielectric structure 20 and the first and second electrodes 23 and 24. The dimensions are in micrometers.

Figure 54:
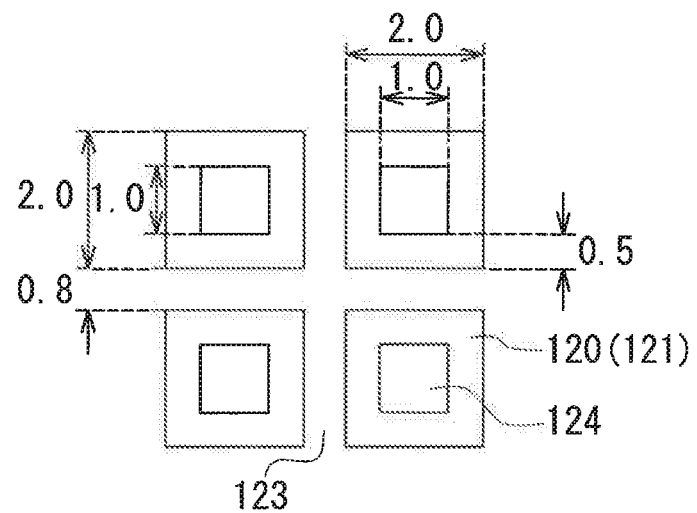
FIG. 54 is an explanatory diagram for explanations of the second model used in the simulation.
Figure 55:
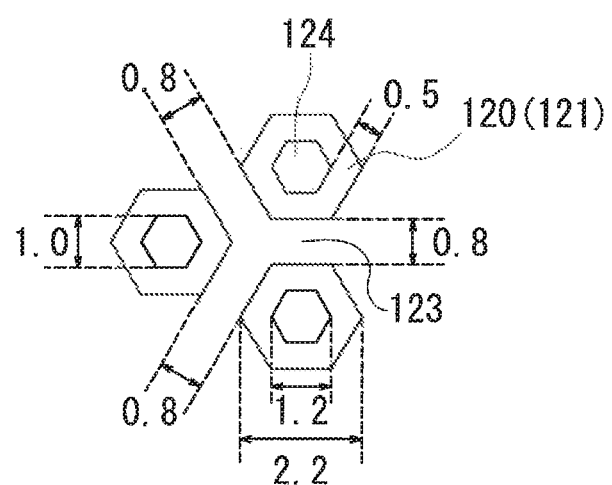
FIG. 55 is an explanatory diagram for explanations of the third model used in the simulation.

FIG. 54 is an explanatory diagram illustrating the shapes and layout of the dielectric structure 120 and the first and second electrodes 123 and 124 of the second model. FIG. 55 is an explanatory diagram illustrating the shapes and layout of the dielectric structure 120 and the first and second electrodes 123 and 124 of the third model. FIG. 54 and FIG. 55 show the dimensions of a plurality of portions defining the shapes and layout of the dielectric structure 120 and the first and second electrodes 123 and 124. The dimensions are in micrometers.

The fourth model is a model of an MLCC as a comparative example. The fourth model has two flat-shaped first electrodes and two flat-shaped second electrodes. When seen in the Z direction, each of the first and second electrodes is in the shape of a square having a side length of 48 μm. In the fourth model, the first and second electrodes are alternately arranged in the Z direction with dielectric layers interposed therebetween. The first and second electrodes and the dielectric layers are each 1 μm in thickness.

In the first model, the first electrode 23, the first conductor layer 61 and the second conductor layer 62 constitute a first conductor portion, and the second electrode 24 constitutes a second conductor portion. Of the outer surface of the first electrode 23, the part facing the second electrode 24 has an area of 7000 μm². The sum total of the area of the part of the outer surface of the first conductor layer 61 facing the second electrode 24 and the area of the part of the outer surface of the second conductor layer 62 facing the second electrode 24 is 1470 µm². The effective area of the first model is therefore 8470 µm².

In the second and third models, the first electrode 123 and the first conductor layer 131 constitute a first conductor portion, and the second electrode 124 and the second conductor layer 132 constitute a second conductor portion.

In the second model, the part of the outer surface of the first electrode 123 facing the second electrode 124 has an area of 9248 µm². The part of the outer surface of the first conductor layer 131 facing the second electrode 124 has an area of 289 µm². The effective area of the second model is therefore 9537 µm².

In the third model, the part of the outer surface of the first electrode 123 facing the second electrode 124 has an area of 9792 µm². The part of the outer surface of the first conductor layer 131 facing the second electrode 124 has an area of 294 µm². The effective area of the third model is therefore 10086 µm².

The effective area of the fourth model is 4608 µm².

The effective area of each of the first to third models is greater than that of the fourth model. Accordingly, the capacitor of the present invention provides a greater capacitance than that of MLCC.

The present invention is not limited to the foregoing embodiments, and various modifications may be made thereto. For example, in the capacitor of the present invention, the shape of the one continuous wall is not limited to that shown in each of the foregoing embodiments, and can be any other shape that is non-straight when seen in the first direction. For example, the one continuous wall may have a spiral shape when seen in the first direction.

Further, the mask to be used for forming the unfired structure is not limited to one formed by patterning a photoresist layer by photolithography. For example, an etching mask may be formed by photolithography on a carbon layer and the carbon layer may be selectively etched using the etching mask to allow the remaining portion of the carbon layer to serve as the mask.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A manufacturing method for a capacitor, the capacitor comprising: a first substrate constituting a bottom surface of the capacitor, a second substrate constituting a top surface of the capacitor, and a layer portion provided between the first substrate and the second substrate, wherein the layer portion includes: a dielectric structure formed of a sintered dielectric, a first electrode formed of a conductor, and a second electrode formed of a conductor, wherein
   the dielectric structure includes at least one continuous wall,
   the first electrode and the second electrode are insulated from each other by the at least one continuous wall,
   the at least one continuous wall has a height and a thickness, the height being a dimension in a first direction, the thickness being a dimension in a second direction orthogonal to the first direction,
   the height is greater than the thickness, and
   the at least one continuous wall has a non-straight shape when seen in the first direction,
   the manufacturing method comprising the steps of:
   forming the dielectric structure formed of the sintered dielectric including at least one continuous wall provided over the first substrate,
   wherein the at least one continuous wall has a height and a thickness, the height being a dimension in a first direction perpendicular to the first substrate, the thickness being a dimension in a second direction orthogonal to the first direction, the height is greater than the thickness, the at least one continuous wall has a non-straight shape when seen in the first direction; and
   forming the first electrode and the second electrode simultaneously by applying a conductor film to either side of at least one continuous wall after the formation of the dielectric structure such that the first electrode and the second electrode are insulated from each other by the at least one continuous wall.

2. The manufacturing method for the capacitor according to claim 1, wherein the step of forming the dielectric structure includes the steps of:
   forming a mask with an opening shaped to correspond to the shape of the dielectric structure;
   forming an unfired structure by loading the material of the dielectric structure into the opening of the mask, the unfired structure being intended to be fired later into the dielectric structure; and
   removing the mask after the formation of the unfired structure and firing the unfired structure into the dielectric structure.

3. The manufacturing method for the capacitor according to claim 2, wherein
   the dielectric structure includes a main portion formed of a first material, and a coating layer formed of a second material different from the first material,
   the main portion has a side surface intersecting the second direction,
   the coating layer covers the side surface of the main portion, and
   the step of forming the unfired structure includes the step of:
   forming an unfired coating layer, the unfired coating layer being intended to be fired later into the coating layer; and
   forming an unfired main portion after the formation of the unfired coating layer, the unfired main portion being intended to be fired later into the main portion.

4. The manufacturing method for the capacitor according to claim 1, wherein
   the capacitor further comprises a first terminal electrically connected to the first electrode, and a second terminal electrically connected to the second electrode, and
   the manufacturing method for the capacitor further comprises the step of forming the first and second terminals after the formation of the first and second electrodes.

5. The manufacturing method for the capacitor according to claim 1, wherein the at least one continuous wall has a zigzag shape when seen in the first direction.

6. The manufacturing method for the capacitor according to claim 1, wherein
   the capacitor further comprises a first conductor layer and a second conductor layer located at different positions in the first direction, and a first dielectric layer and a second dielectric layer,
   the dielectric structure and the first and second electrodes are located between the first conductor layer and the second conductor layer, the first electrode is connected to the first conductor layer and the second conductor layer, the first dielectric layer insulates the second electrode from the first conductor layer, the second dielectric layer insulates the second electrode from the second conductor layer, and the manufacturing method for the capacitor further comprises the steps of:
- forming the first conductor layer before the formation of the dielectric structure;
- forming the first dielectric layer after the formation of the first conductor layer and before the formation of the dielectric structure;
- forming the second dielectric layer after the formation of the first and second electrodes; and
- forming the second conductor layer after the formation of the second dielectric layer.

7. The manufacturing method for the capacitor according to claim 1, wherein the at least one continuous wall is a plurality of walls formed to define a plurality of cavities, the first electrode is disposed around the plurality of walls, and the second electrode includes a plurality of pillar portions disposed in the plurality of cavities.

8. The manufacturing method for the capacitor according to claim 7, wherein the capacitor further comprises a first conductor layer and a second conductor layer located at different positions in the first direction, and a first dielectric layer and a second dielectric layer, the dielectric structure and the first and second electrodes are located between the first conductor layer and the second conductor layer, one of the first electrode and the second electrode is connected to the first conductor layer, the other of the first electrode and the second electrode is connected to the second conductor layer, the first dielectric layer insulates the other of the first electrode and the second electrode from the first conductor layer, the second dielectric layer insulates the one of the first electrode and the second electrode from the second conductor layer, and the manufacturing method for the capacitor further comprises the steps of:
- forming the first conductor layer before the formation of the dielectric structure;
- forming the first dielectric layer after the formation of the first conductor layer and before the formation of the dielectric structure;
- forming the second dielectric layer after the formation of the first and second electrodes; and
- forming the second conductor layer after the formation of the second dielectric layer.

9. A manufacturing method for a capacitor, the capacitor comprising: a first substrate constituting a bottom surface of the capacitor, a second substrate constituting a top surface of the capacitor, a plurality of layer portions stacked in a first direction provided between the first substrate and the second substrate, wherein each of the plurality of layer portions includes: a dielectric structure formed of a sintered dielectric a first electrode formed of a conductor and a second electrode formed of a conductor, the dielectric structure includes at least one continuous wall, the first electrode and the second electrode are insulated from each other by the at least one continuous wall, the at least one continuous wall has a height and a thickness, the height being a dimension in the first direction, the thickness being a dimension in a second direction orthogonal to the first direction, the height is greater than the thickness, the at least one continuous wall has a non-straight shape when seen in the first direction, the first electrodes of the plurality of layer portions are electrically connected to each other, and the second electrodes of the plurality of layer portions are electrically connected to each other, the manufacturing method comprising a layer-portion formation step repeated for forming each of the plurality of layer portions stacked in the first direction, the layer-portion formation step including the steps of:

forming the dielectric structure formed of a sintered dielectric including at least one continuous wall provided over the first substrate;

wherein the at least one continuous wall has a height and a thickness, the height being a dimension in a first direction perpendicular to the first substrate, the thickness being a dimension in a second direction orthogonal to the first direction, the height is greater than the thickness, the at least one continuous wall has a non-straight shape when seen in the first direction; and forming the first electrode and the second electrode simultaneously by applying a conductor film to either side of at least one continuous wall after the formation of the dielectric structure such that the first electrode and the second electrode are insulated from each other by the at least one continuous wall wherein the first electrodes of the plurality of layer portions are electrically connected to each other, and the second electrodes of the plurality of layer portions are electrically connected to each other.

* * * * *